US007184156B2

(12) United States Patent
Tateyama

(10) Patent No.: US 7,184,156 B2
(45) Date of Patent: Feb. 27, 2007

(54) IMAGE PROCESSING SYSTEM AND CONTROL METHOD, AND IMAGE PROCESSING APPARATUS

(75) Inventor: Jiro Tateyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 09/934,855

(22) Filed: Aug. 23, 2001

(65) Prior Publication Data

US 2002/0054344 A1    May 9, 2002

(30) Foreign Application Priority Data

Aug. 29, 2000  (JP)  .............................. 2000-259714

(51) Int. Cl.
*G06F 15/00* (2006.01)
*G06F 3/12* (2006.01)
*G06F 15/16* (2006.01)
*G06F 13/38* (2006.01)
*G06F 9/44* (2006.01)

(52) U.S. Cl. .................... 358/1.15; 358/1.13; 709/208; 710/63; 717/131

(58) Field of Classification Search ............... 358/1.13, 358/1.15; 710/313, 15–20, 63; 725/139; 709/208, 228; 717/131
See application file for complete search history.

(56) References Cited

U.S. PATENT DOCUMENTS

| 5,787,308 | A | | 7/1998 | Suzuki et al. ............... 395/839 |
| 6,003,065 | A | * | 12/1999 | Yan et al. ................... 709/201 |
| 6,018,816 | A | | 1/2000 | Tateyama ................... 714/746 |
| 6,931,633 | B1 | * | 8/2005 | Vazquez et al. ............. 717/131 |

* cited by examiner

*Primary Examiner*—King Y. Poon
*Assistant Examiner*—Thomas J Lett
(74) *Attorney, Agent, or Firm*—Fitzpatrick, Cella, Harper & Scinto

(57) ABSTRACT

In a system corresponding to direct printing, even though respective devices have a series of processing functions, high processing performance of the entire system cannot be expected. Accordingly, printing time is longer than that in a system having a personal computer. In a system having a digital camera, a printer and a set top box as a digital broadcast tuner interconnected via a 1394 serial bus, an image processing program necessary for direct printing is downloaded from e.g. the printer to the set top box which lacks an image processing function. Then, time required for data processing on a sample image is calculated at each of processing steps of the image processing, and a device to execute data conversion is determined based on the processing time. By this arrangement, direct printing can be efficiently performed.

21 Claims, 32 Drawing Sheets

FIG. 7
CSR CORE REGISTER

| OFFSET (HEXADECIMAL) | REGISTER NAME | FUNCTION |
|---|---|---|
| 000 | STATE_CLEAR | INFORMATION ABOUT STATUS AND CONTROL |
| 004 | STATE_SET | INFORMATION REPRESENTING WHETHER STATE_CLEAR CAN BE WRITTEN |
| 008 | NODE_IDS | BUS ID + NODE ID |
| 00C | RESET_START | RESET BUS BY WRITE IN THIS AREA |
| 010~014 | INDIRECT_ADDRESS, INDIRECT_DATA | REGISTER FOR ACCESSING ROM LARGER THAN 1K |
| 018~01C | SPLIT_TIMEOUT | VALUE OF TIMER FOR DETECTING TIME-OUT OF SPLIT TRANSACTION |
| 020~02C | ARGUMENT, TEST_START, TEST_STATUS | DIAGNOSTIC REGISTER |
| 030~04C | UNITS_BASE, UNITS_BOUND, MEMORY_BASE, MEMORY_BOUND | UNUSED IN IEEE1394 |
| 050~054 | INTERRUPT_TARGET, INTERRUPT_MASK | INTERRUPT NOTIFICATION REGISTER |
| 058~07C | CLOCK_VALUE, CLOCK_TICK_PERIOD, CLOCK_STROBE_ARRIVED, CLOCK_INFO | UNUSED IN IEEE1394 |
| 080~0FC | MESSAGE_REQUEST, MESSAGE_RESPONSE | MESSAGE NOTIFICATION REGISTER |
| 100~17C | | RESERVED |
| 180~1FC | ERROR_LOG_BUFFER | RESERVED FOR IEEE1394 |

FIG. 8
SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONIZING TIME |
| 208 | POWER_FAIL_IMMINENT | REGISTER CONCERNING POWER SUPPLY |
| 20C | POWER_SOURCE | |
| 210 | BUSY_TIMEOUT | CONTROL RETRY OF TRANSACTION LAYER |
| 214~218 | | RESERVED |
| 21C | BUS_MANAGER_ID | NODE ID OF BUS MANAGER |
| 220 | BANDWIDTH_AVAILABLE | MANAGE ISOCHRONOUS TRANSFER BANDWIDTH |
| 224~228 | CHANNELS_AVAILABLE | MANAGE ISOCHRONOUS TRANSFER CHANNEL NUMBER |
| 22C | MAINT_CONTROL | DIAGNOSTIC REGISTER |
| 230 | MAINT_UTILITY | |
| 234~3FC | | RESERVED |

CONFIGURATION ROM OF MINIMUM FORMAT

FIG. 11

SERIAL BUS DEVICE REGISTER

| OFFSET (HEXADECIMAL) | REGISTER NAME | FUNCTION |
|---|---|---|
| 800~FFC | | RESERVED |
| 1000~13FC | TOPOLOGY_MAP | INFORMATION ABOUT CONFIGURATION OF SERIAL BUS |
| 1400~1FFC | | RESERVED |
| 2000~2FFC | SPEED_MAP | INFORMATION ABOUT TRANSFER SPEED OF SERIAL BUS |
| 3000~FFFC | | RESERVED |

SECTIONAL VIEW OF CABLE

☑ : PORT
p : PORT CONNECTED TO PARENT NODE
c : PORT CONNECTED TO CHILD NODE

REQUESTS FOR BUS ACCESS

PERMISSION FOR BUS ACCESS

PACKET OF ISOCHRONOUS DATA

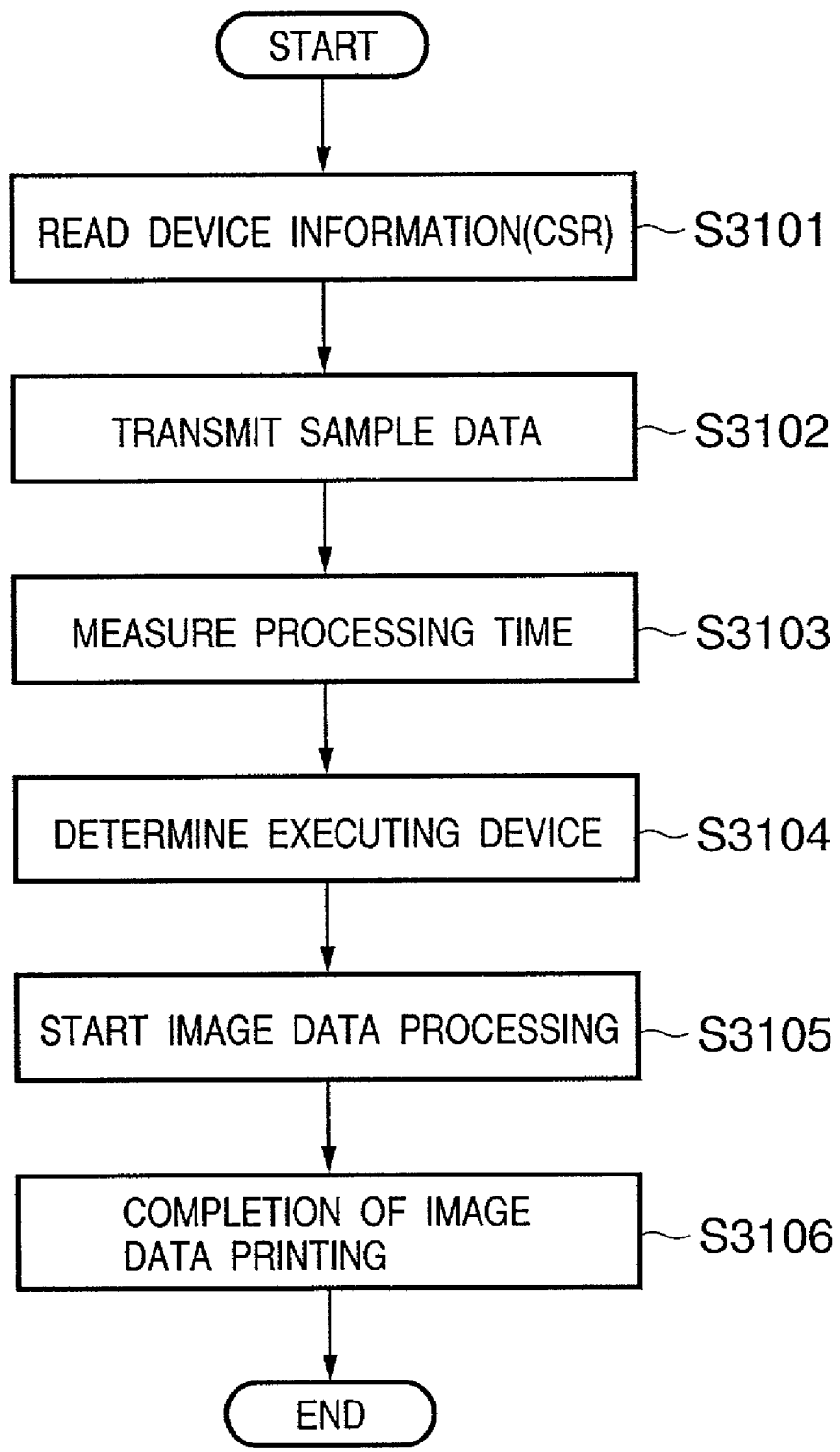

IMAGE PROCESSING SYSTEM AND CONTROL METHOD, AND IMAGE PROCESSING APPARATUS

FIELD OF THE INVENTION

The present invention relates to an image processing system having plural devices interconnected via a serial bus and a control method for the system, and an image processing apparatus.

BACKGROUND OF THE INVENTION

To print an image obtained by a digital camera, required is a procedure to transfer image data via a serial interface such as an RS-232C interface or a memory card to a personal computer, then, to perform processing corresponding to a print format of a printer on the image data in the personal computer, then sent print data via a parallel interface such as a Centronics interface or a serial interface such as a USB (Universal Serial Bus) interface to the printer, and print an image by the printer.

If a user of the digital camera has a personal computer, the user generally performs image processing by using necessary application software and performs printing by a printer connected to the personal computer. However, if the user does not have a personal computer, as the user has no means for printing the image obtained by the digital camera, the user connects the digital camera to a video terminal of a home television set and only watches the obtained image on the television screen.

A printer system in the form of video printer has been provided to such user. The video printer directly transfers image data from a digital camera to a printer by using a serial interface of its original specification, an infrared interface, a memory card or the like without a personal computer, performs image processing in the printer, and performs printing. Note that printing by transferring image data to a printer without personal computer is generally called "direct printing".

As the print system to perform direct printing does not have a personal computer, it is necessary to convert JPEG (Joint Photographic Experts Group) compressed image data to print data in any device (digital camera or printer). Accordingly, the processing speed is greatly influenced by data processing performance of the device.

For example, since a general printer is constructed on the precondition that a personal computer performs processing to convert image data to printer-specific print data, the printer has no high-level data processing performance for the sake of cost-priority specification.

In the direct-print printer, to improve the processing performance to convert image data to print data, it is necessary to expand functions by e.g. increasing the processing speed of CPU, distribution of processing by using plural CPU's, and increasing in data size to be converted at once by increasing in internal memory capacity.

Further, an image supply device (e.g. digital camera) corresponding to the direct printing may be provided with a print data generation function. Although a general digital camera or the like has fully high processing performance of image data compression, decompression and display and the like, it does not have high performance of print data generation.

That is, the image supply device and printing device corresponding to the direct printing provide a series of processing functions, however, any of the devices cannot be expected to have high processing performance. Accordingly, printing time is longer in comparison with the system having the personal computer.

SUMMARY OF THE INVENTION

The present invention has been proposed to solve the conventional problems, and has as its object to provide an image processing system, a control method and an image processing apparatus in a system having plural devices connected via a serial bus for determining an optimum device to execute predetermined image processing and a processing route.

According to the present invention, the forgoing object is attained by providing an image processing system having plural devices, including a device capable of executing predetermined image processing, interconnected via a serial bus, wherein a processing program for execution of the image processing is downloaded from the device capable of executing predetermined image processing to a device among the plural devices without a function of executing the image processing, and wherein processing performance information indicating performance of executing the image processing is obtained from each of the plural devices, further wherein an executing device to execute the image processing is determined from the plural devices based on the processing performance information.

In accordance with the present invention as described above, processing time can be reduced.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing an example of the address and function of information stored in a CSR core register;

FIG. 8 is a view showing an example of the address and function of information stored in a serial bus register;

FIG. 11 is a view showing an example of the address and function of information stored in the serial bus register of a unit space;

FIG. 31 is a flowchart showing executing device selection processing by negotiation on the 1394 interface.

DETAILED DESCRIPTION OF THE PREFERRED EMBODIMENT

A preferred embodiment of the present invention will now be described in detail in accordance with the accompanying drawings.

Figure 1:
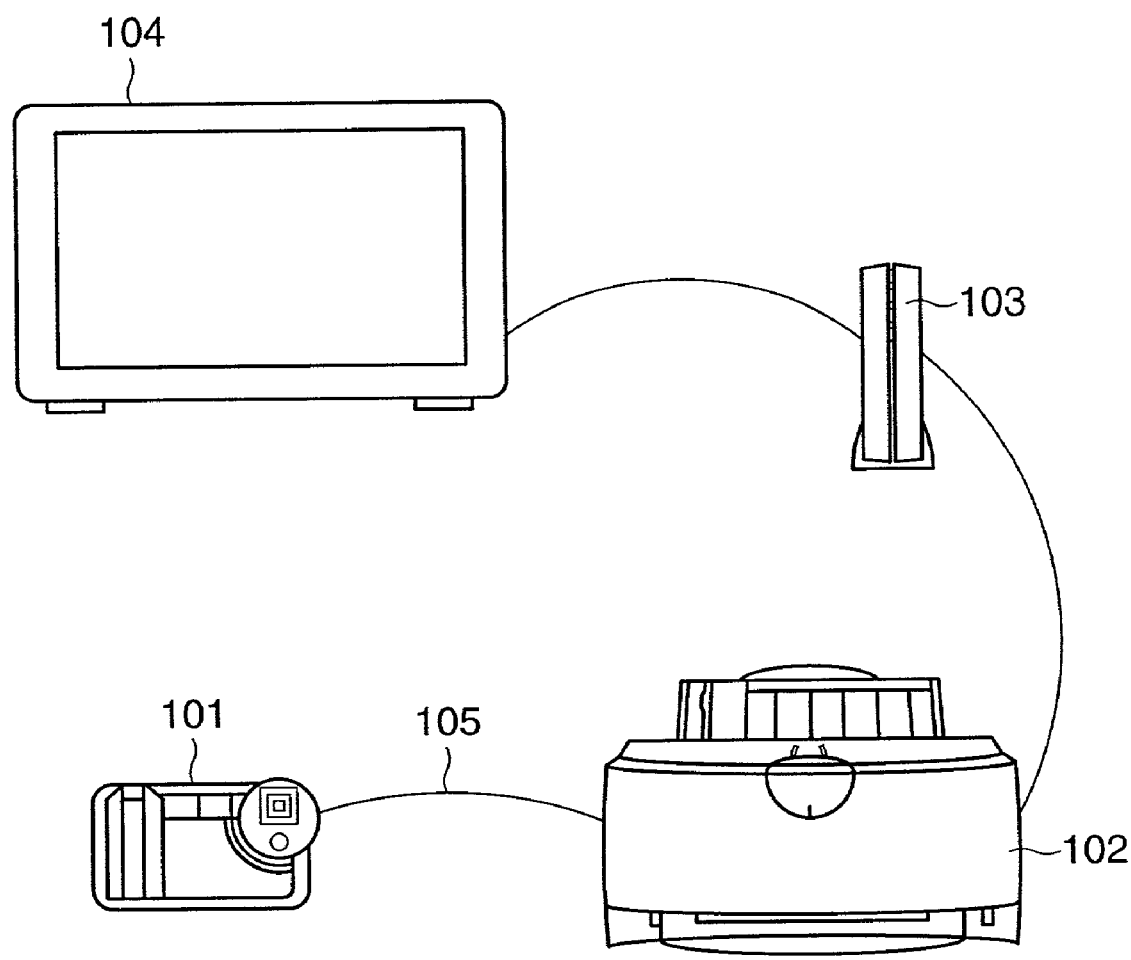
FIG. 1 is a schematic diagram showing the schematic configuration of the embodiment according to the present invention.

FIG. 1 is a schematic diagram showing a general connection of a system to which the present invention is applied, in which a digital camera 101 as an image supply device, an ink-jet printer 102 as a printing device, a set top box (STB) 103 as a digital broadcast tuner, and a home television set 104 are interconnected via a serial interface 105.

In the present embodiment, as the serial interface connecting the respective device, an IEEE1394-1995 standard serial bus (hereinbelow referred to as a "1394 serial bus") is employed. Note that in FIG. 1, more devices can be connected via the 1394 serial bus.

<Technical Overview of IEEE 1394 Standard>

The technique of the IEEE 1394-1995 standard applied to the serial interface shown in FIG. 1 will be explained. Details of the IEEE 1394-1995 standard (to be referred to as the "IEEE 1394 standard" hereinafter) are described in "IEEE Standard for a High Performance Serial Bus" published by IEEE (The Instituted of Electrical and Electronics Engineers, Inc.), Aug. 30, 1996.

(1) Overview

Figure 2:
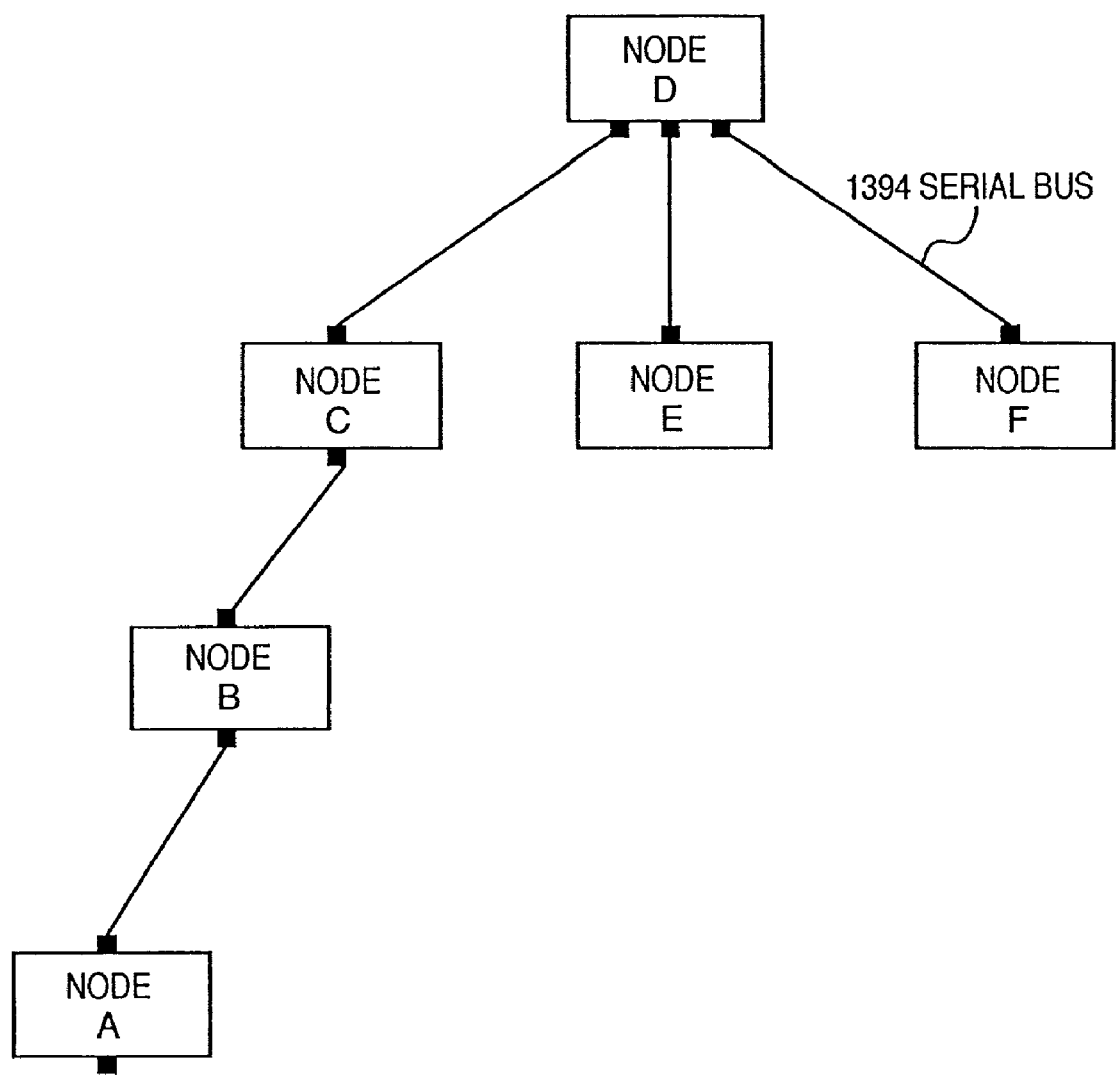
FIG. 2 is a view showing an example of a 1394 network configuration.

FIG. 2 shows an example of a communication system (to be referred to as a "1394 network") constituted by nodes having digital interfaces complying with the IEEE 1394 standard (to be referred to as "1394 interfaces"). The 1394 network constitutes a bus type network capable of communicating serial data.

In FIG. 2, nodes A to H are connected via an IEEE 1394-compliant communication cable. These nodes A to H are electronic devices such as a PC (Personal Computer), digital VTR (Video Tape Recorder), DVD (Digital Video Disc) player, digital camera, hard disk, and monitor.

The connection method of the 1394 network includes a daisy chain method and node branch method, and enables connection with a high degree of freedom.

The 1394 network automatically performs bus reset when, e.g., an existing device is omitted, a new device is added, or an existing device is turned on/off. By performing this bus reset, the 1394 network can automatically recognize a new connection configuration and assign ID information to each device. This function allows the 1394 network to always recognize the network connection configuration.

The 1394 network has a function of relaying data transferred from another device. This function allows all the devices to grasp the operation status of the bus.

The 1394 network has a function called plug & play. This function allows the 1394 network to automatically recognize connected devices by only connecting them without turning off all the devices.

The 1394 network copes with data transfer speeds of 100/200/400 Mbps. A device having a higher data transfer speed can support a lower data transfer speed, so that devices having different data transfer speeds can be connected.

The 1394 network further copes with two different data transfer schemes (i.e., asynchronous and isochronous transfer modes).

The asynchronous transfer mode is effective in transferring data (i.e., a control signal and file data) which must be asynchronously transferred if necessary. The isochronous transfer mode is effective in transferring data (i.e., video data and audio data) which must be successively transferred by a predetermined amount at a constant data transfer speed.

The asynchronous and isochronous transfer modes can be mixed in each communication cycle (one cycle is generally 125 µS). Each transfer mode is executed after transfer of a cycle start packet (to be referred to as a "CSP") representing the start of the cycle.

In each communication cycle period, the isochronous transfer mode has higher priority than the asynchronous transfer mode. The transfer band of the isochronous transfer mode is ensured in each communication cycle.

(2) Architecture

Figure 3:
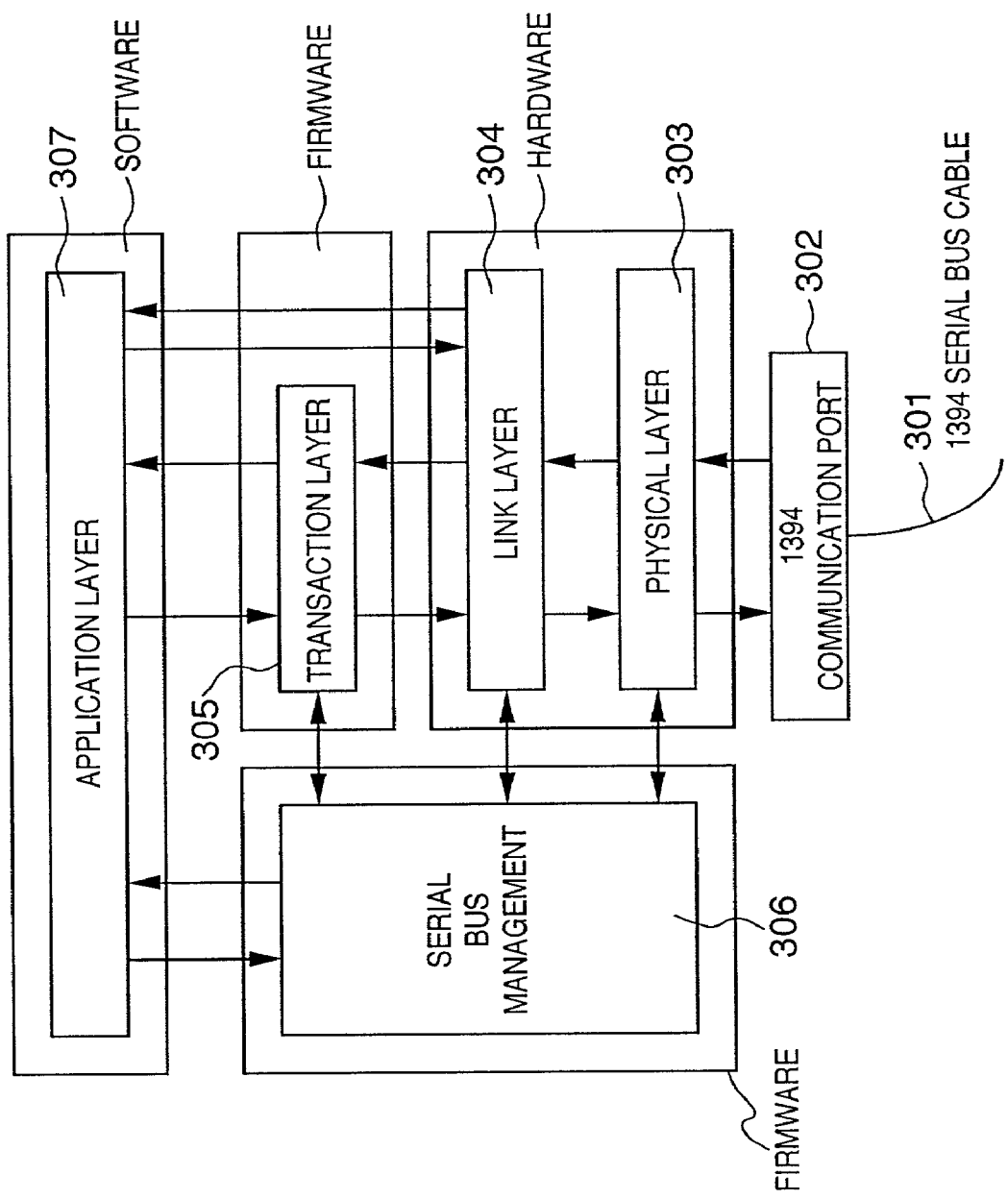
FIG. 3 is a block diagram for explaining the architecture of an IEEE 1394 standard.

The architecture of the IEEE 1394 standard will be described with reference to FIG. 3. FIG. 3 is a block diagram showing the architecture of the IEEE 1394 standard in the first embodiment.

The building elements of the IEEE 1394 interface will be explained. The IEEE 1394 interface is functionally made up of a plurality of layers (hierarchies). In FIG. 3, the IEEE 1394 interface is connected to the IEEE 1394 interface of another node via an IEEE 1394-compliant communication cable 301. The IEEE 1394 interface has one or more communication ports 302, and each communication port 302 is connected to a physical layer 303 included in hardware.

In FIG. 3, the hardware is comprised of the physical layer 303 and a link layer 304. The physical layer 303 performs a physical, electrical interface with another node, detection of bus reset and its processing, encoding/decoding of input and output signals, and arbitration of bus access. The link layer 304 performs generation and transmission/reception of a communication packet, and control of the cycle timer.

In FIG. 3, the firmware includes a transaction layer 305 and serial bus management 306. The transaction layer 305 manages the asynchronous transfer mode, and provides various transactions (read, write, and lock). The serial bus management 306 provides a function of controlling the self node, managing the connection state of the self node, managing the ID information of the self node, and managing the resource of the serial bus network on the basis of a CSR architecture (to be described later).

The hardware units 303 and 304 and the firmware units 305 and 306 substantially constitute a 1394 interface. The basic arrangement is defined by the IEEE 1394 standard.

An application layer 307 included in the software changes depending on application software in use, and controls how to communicate data on the network. For example, for moving picture data of a digital VTR, the application layer 307 is defined by a communication protocol such as an AV/C protocol.

(2-1) Function of Link Layer 304

Figure 4:
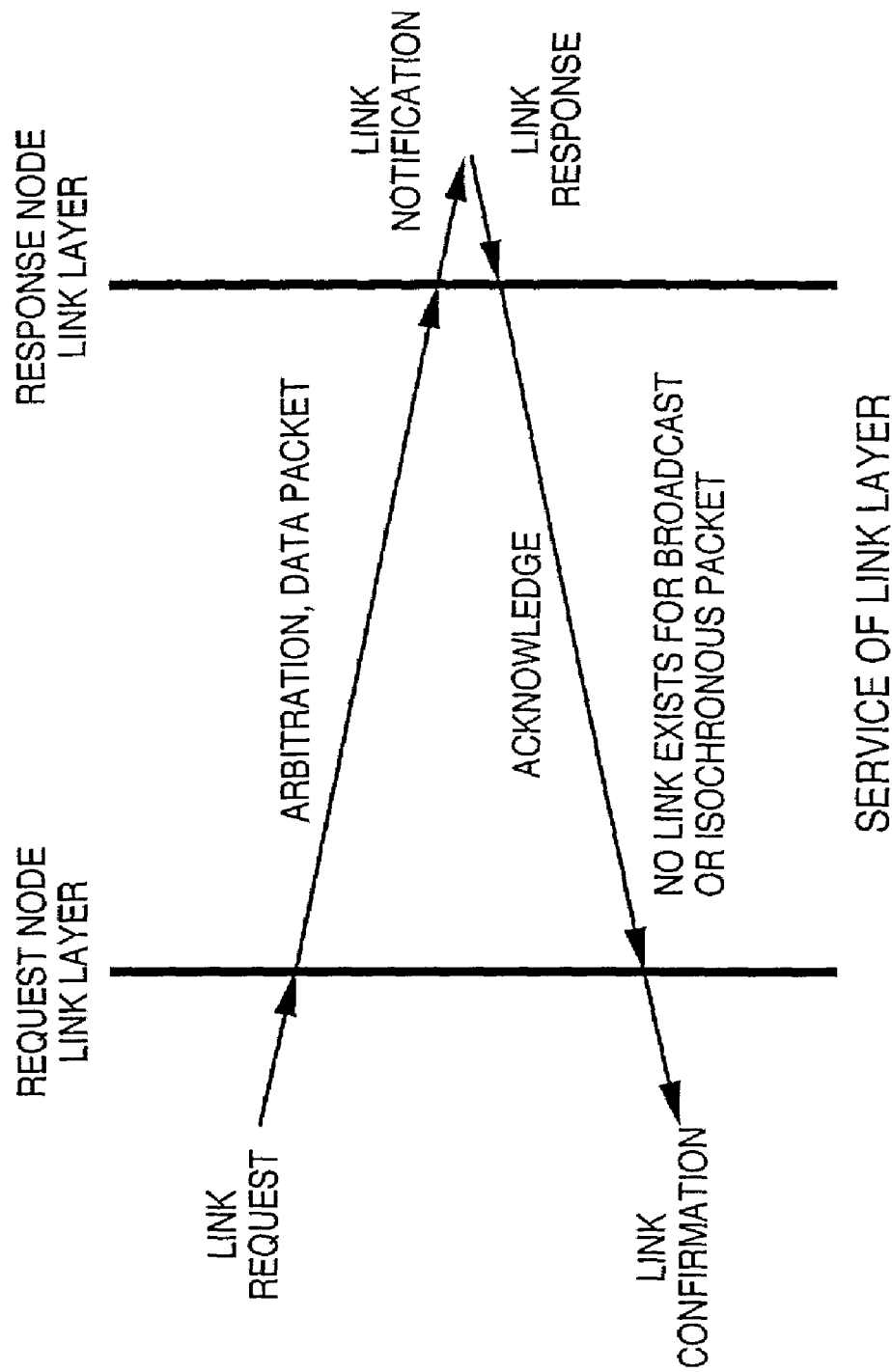
FIG. 4 is a view showing services which can be provided by a link layer.

FIG. 4 is a view showing services which can be provided by the link layer 304. In FIG. 4, the link layer 304 provides the following four services:

① Link request (LK_DATA.request) for requesting transfer of a predetermined packet of a response node
② Link indication (LK_DATA.indication) for indicating reception of a predetermined packet to a response node
③ Link response (LK_DATA.response) representing reception of an acknowledge from a response node
④ Link confirmation (LK_DATA.confirmation) for confirming an acknowledge from a request node Note that the link response (LK_DATA.response) does not exist in broadcast communication and the transfer of an isochronous packet.

Based on these services, the link layer 304 realizes the two transfer schemes, i.e., asynchronous and isochronous transfer modes.

(2-2) Function of Transaction Layer 305

Figure 5:
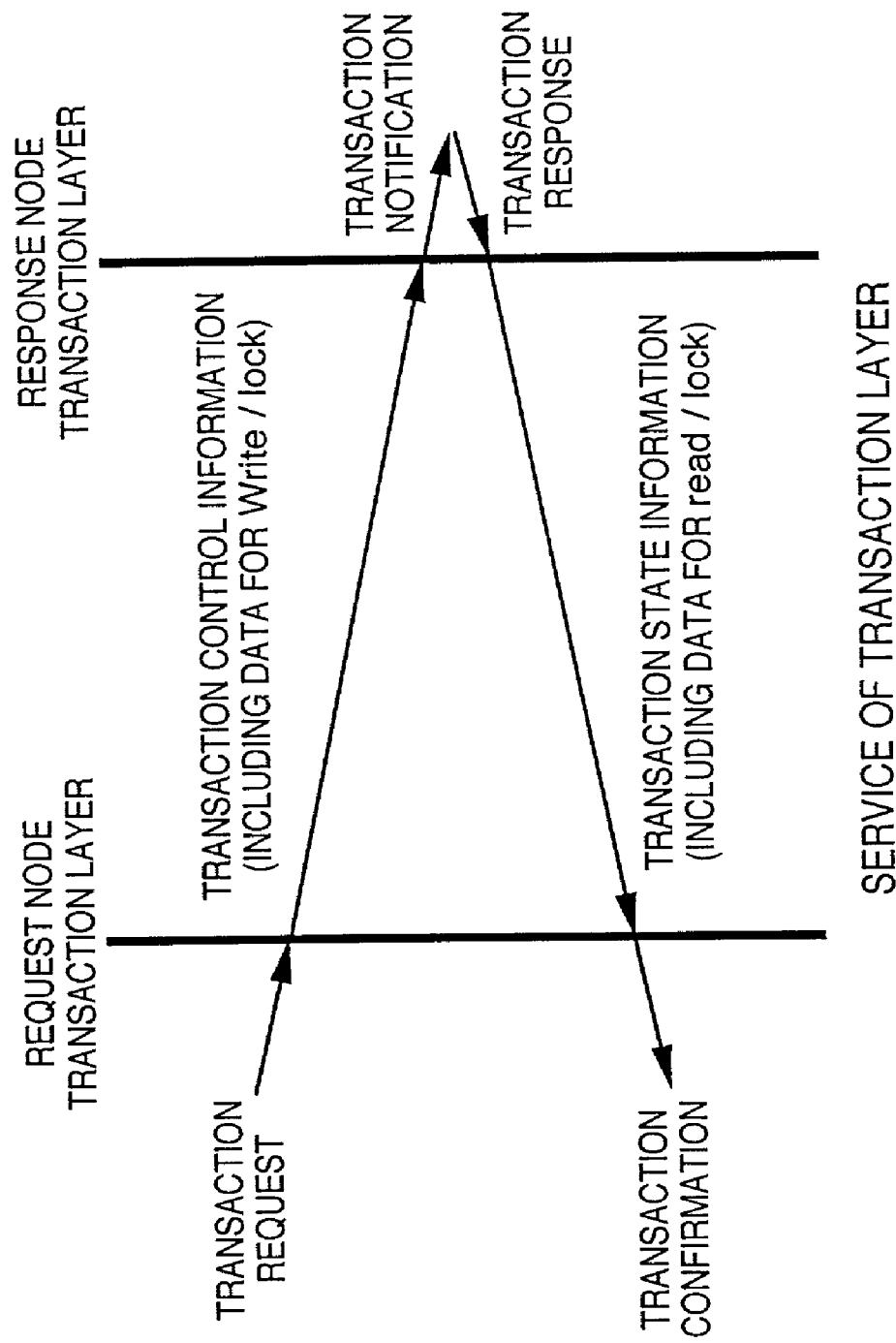
FIG. 5 is a view showing services which can be provided by a transaction layer.

FIG. 5 is a view showing services which can be provided by the transaction layer 305. In FIG. 5, the transaction layer 305 provides the following four services:

① Transaction request (TR_DATA.request) for requesting a predetermined transaction of a response node
② Transaction indication (TR_DATA.indication) for indicating reception of a predetermined transaction request to a response node
③ Transaction response (TR_DATA.response) representing reception of state information (including data for write and lock) from a response node
④ Transaction confirmation (TR_DATA.confirmation) for confirming state information from a request node Based on these services, the transaction layer 305 manages asynchronous transfer, and realizes the following three transactions:

① Read transaction
② Write transaction
③ Lock transaction

In ① read transaction, a request node reads information stored at a specific address of a response node.

In ② write transaction, the request node writes predetermined information at a specific address of the response node.

In ③ lock transaction, the request node transfers reference data and update data to the response node, compares information at a specific address of the response node with the reference data, and updates the information at the specific address to the update data in accordance with the comparison result.

(2-3) Function of Serial Bus Management 306

The serial bus management 306 can provide the following three functions, i.e., ①) node control,② isochronous resource manager (to be referred to as an "IRM"), and ③ bus manager.

① Node control provides a function of managing the above-described layers, and managing asynchronous transfer executed with another node.

① The IRM provides a function of managing isochronous transfer executed with another node. More specifically, the IRM manages pieces of information necessary to assign a transfer bandwidth and a channel number, and provides these pieces of information to another node.

The IRM exists only on a local bus, and is dynamically selected from other candidates (nodes having the IRM function) every bus reset. The IRM may provide some of functions (connection configuration management, power supply management, speed information management, and the like) which can be provided by the bus manager (to be described below).

③ The bus manager has the IRM function, and provides a more advanced bus management function than the IRM.

More specifically, the bus manager has a function of performing more advanced power supply management (manage, for each node, information representing whether power can be supplied via a communication cable and whether power must be supplied), more advanced speed information management (manage the maximum transfer speed between nodes), more advanced connection configuration management (create a topology map), and bus optimization based on these pieces of management information, and providing the pieces of information to another node.

The bus manager can provide an application with a service for controlling a serial bus network. This service includes a serial bus control request (SB_CONTROL.request), serial bus event control confirmation (SB_CONTROL.confirmation), and serial bus event indication (SB_CONTROL.indication).

The serial bus control request (SB_CONTROL.request) is a service of requesting bus reset by an application.

The serial bus event control confirmation (SB_CONTROL.confirmation) is a service of confirming the serial bus control request (SB_CONTROL.request) for the application. The serial bus event indication (SB_CONTROL.indication) is a service of indicating an asynchronously generated event to the application.

(3) Description of Addressing

Figure 6:
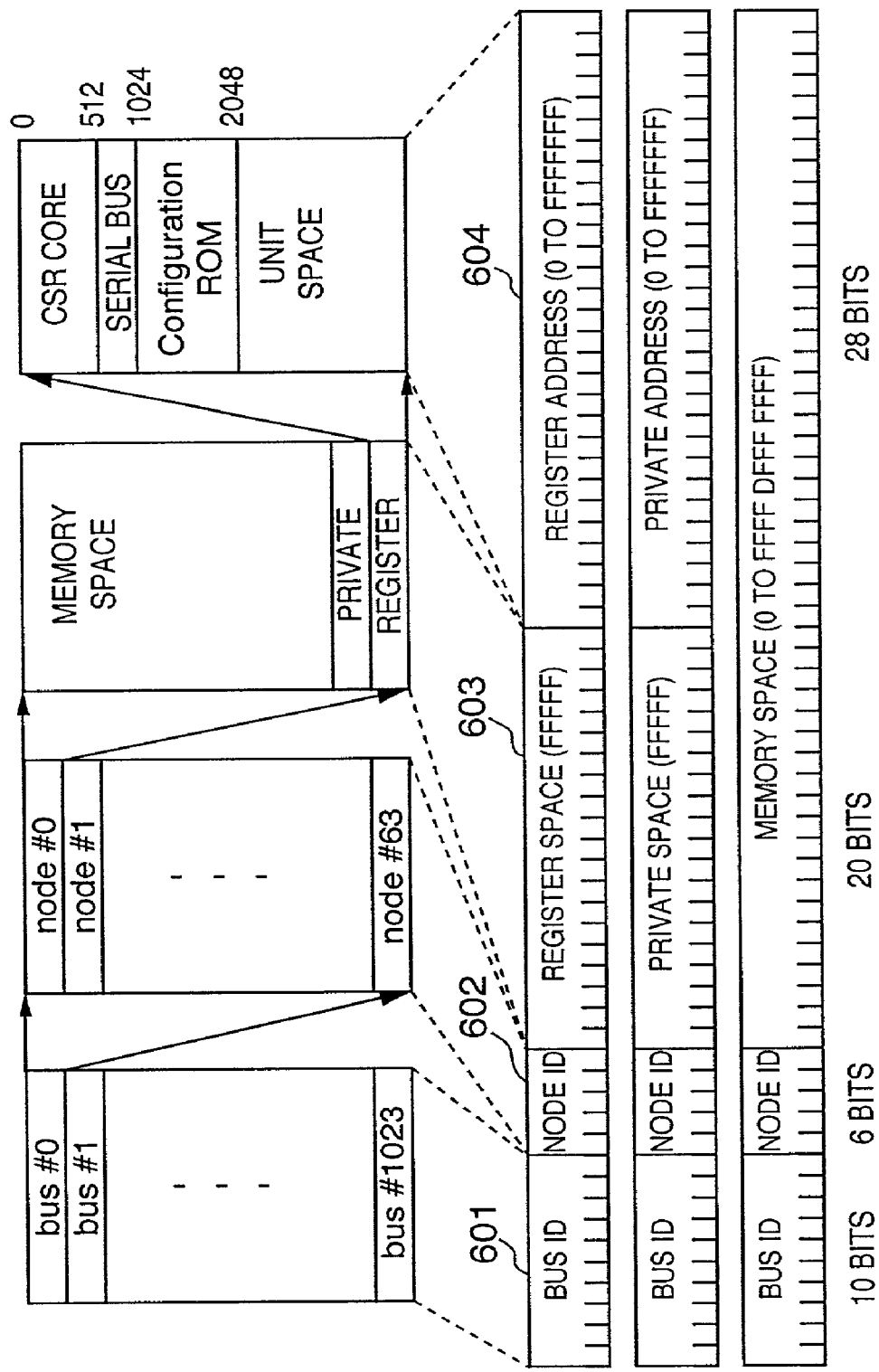
FIG. 6 is a view for explaining the address space of a 1394 serial bus.

FIG. 6 is a view for explaining an address space in the 1394 interface. The 1394 interface defines a 64-bit address space in accordance with a CSR (Command and Status Register) architecture complying with ISO/IEC 13213:1994.

In FIG. 6, a 10-bit field 601 is used for an ID number for designating a predetermined bus, and a 6-bit field 602 is used for an ID number for designating a predetermined device (node). The upper 16 bits will be called a "node ID", and each node identifies another node using this node ID. Each node can also perform communication with an identified partner using this node ID.

The remaining 48-bit field designates an address space (256-Mbyte structure) of each node. Of this field, a 20-bit field 603 designates a plurality of areas constituting an address space.

In the field 603, an area "0-0xFFFFD" is called a memory space.

An area "0xFFFFE" is called a private space, and represents addresses freely usable by each node. The area "0xFFFFE" is called a register space, and stores information common to nodes connected to a bus. Each node can use information of the register space to manage communication between nodes.

A 28-bit field 604 designates an address where information common or unique to each node is stored.

For example, the first 512 bytes in the register space are used for a CSR architecture core (CSR core) register. FIG. 7 shows the address and function of information stored in the CSR core register. The offset in FIG. 7 is a relative position from "0xFFFFF0000000".

The next 512 bytes in FIG. 6 are used for a serial bus register. FIG. 8 shows the address and function of information stored in the serial bus register. The offset in FIG. 8 is a relative position from "0xFFFFF0000200".

Figure 9:
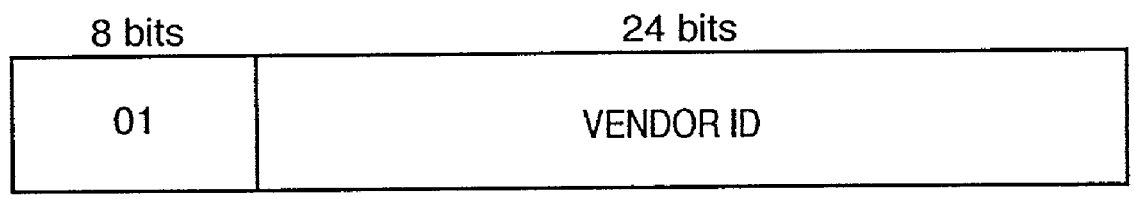
FIG. 9 is a view showing a structure of a configuration ROM of the minimum format.

The next 1,024 bytes in FIG. 6 are used for a configuration ROM. The configuration ROM has minimum and general formats, and is arranged from "0xFFFFF0000400". FIG. 9 shows a configuration ROM of the minimum format. In FIG. 9, a vender ID is a 24-bit numerical value uniquely assigned to each vendor by IEEE.

Figure 10:
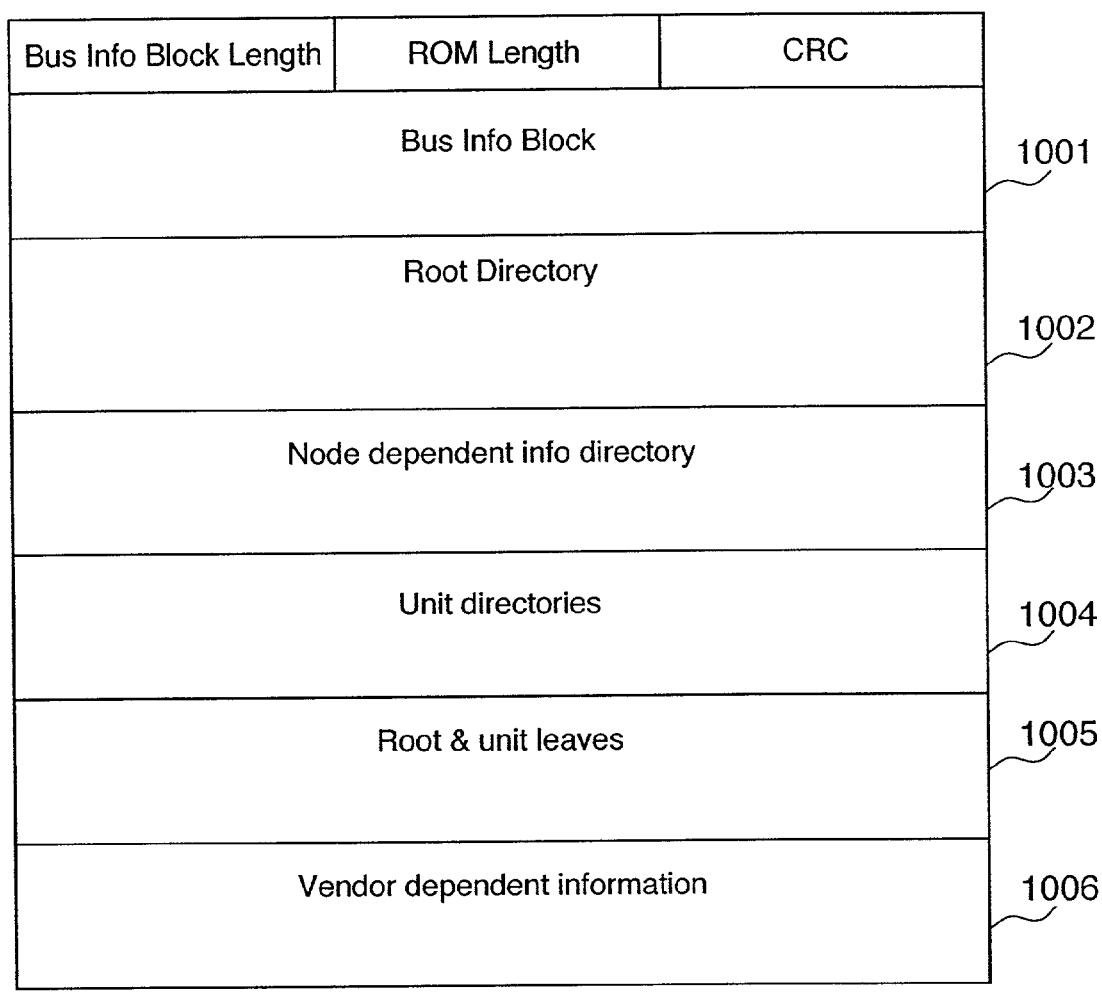
FIG. 10 is a view showing a structure of a configuration ROM of the general format.

FIG. 10 shows a configuration ROM of the general format. In FIG. 10, the vendor ID is stored in a root directory 1002. A bus inform block 1001 and root leaf 1005 can hold node unique IDs as unique ID information for identifying each node.

The node unique ID determines a unique ID capable of specifying one node regardless of the manufacturer and model. The node unique ID is made up of 64 bits. The upper 24 bits represent a vendor ID, and the lower 48 bits represent information (e.g., the manufacturing number of a node) freely settable by the manufacturer of each node. The node unique ID is used when, for example, a specific node is kept recognized before and after bus reset.

In FIG. 10 showing the configuration ROM of the general format, the root directory 1002 can hold information about the basic function of a node. Detailed functional information is stored in subdirectories (unit directories 1004) offset from the root directory 1002. The unit directories 1004 store, e.g., information about software units supported by a node. More specifically, the unit directories 1004 hold information about a data transfer protocol for data communication between nodes, and a command set for defining predetermined communication procedures.

In FIG. 10, a node dependent info directory 1003 can hold information unique to a device. The node dependent info directory 1003 is offset from the root directory 1002.

In FIG. 10, vendor dependent information 1006 can hold information unique to a vendor which manufactures or sells nodes.

The remaining area is called a unit space, and designates an address where information unique to each node, e.g., identification information (manufacturer name, model name, or the like) or use conditions of each device are stored. FIG. 11 shows the address and function of information stored in the serial bus register of the unit space. The offset in FIG. 11 is a relative position from "0xFFFFF0000800".

In general, to simplify the design of different types of bus systems, each node should use only the first 2,048 bytes of the register space. In other words, the bus system is desirably constituted by 4,096 bytes as a total of the CSR core register, the serial bus register, the configuration ROM, and the first 2,048 bytes of the unit space.

(4) Structure of Communication Cable

Figure 12:
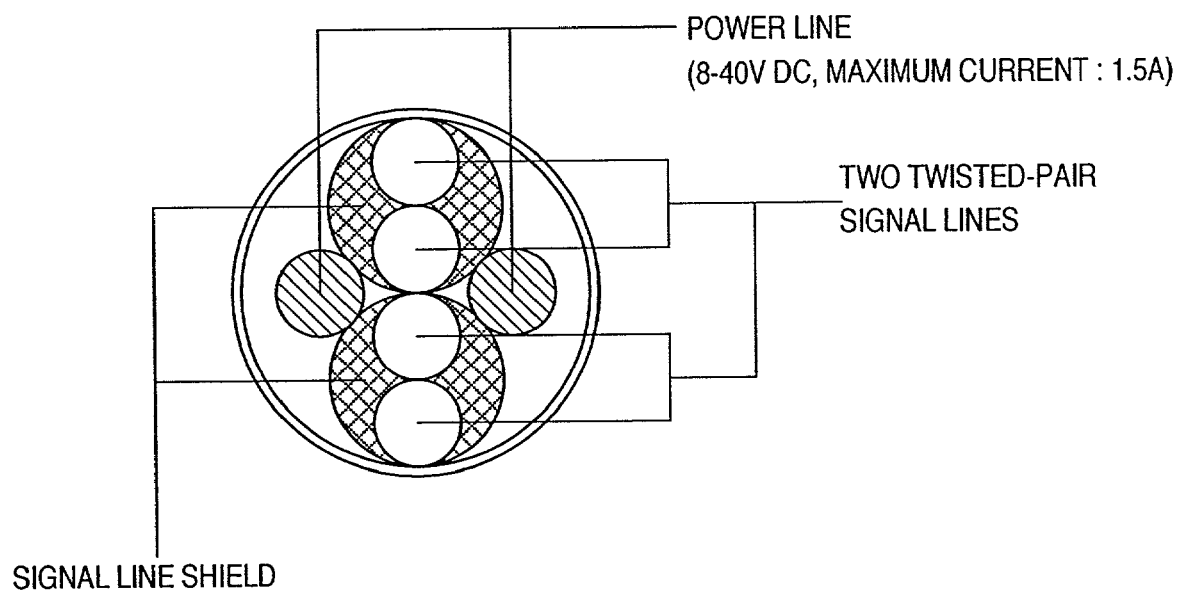
FIG. 12 is a sectional view showing a 1394 serial bus cable.

FIG. 12 is a sectional view showing an IEEE 1394-compliant communication cable.

The communication cable is made up of two twisted-pair signal lines and a power supply line. This power supply line can supply power even to a device whose main power supply is turned off, or a device which decreases in power due to a failure. The power supply voltage flowing through the power supply line is defined as 8 to 40 V, and the current is defined as a maximum of DC 1.5 A.

Figure 13:
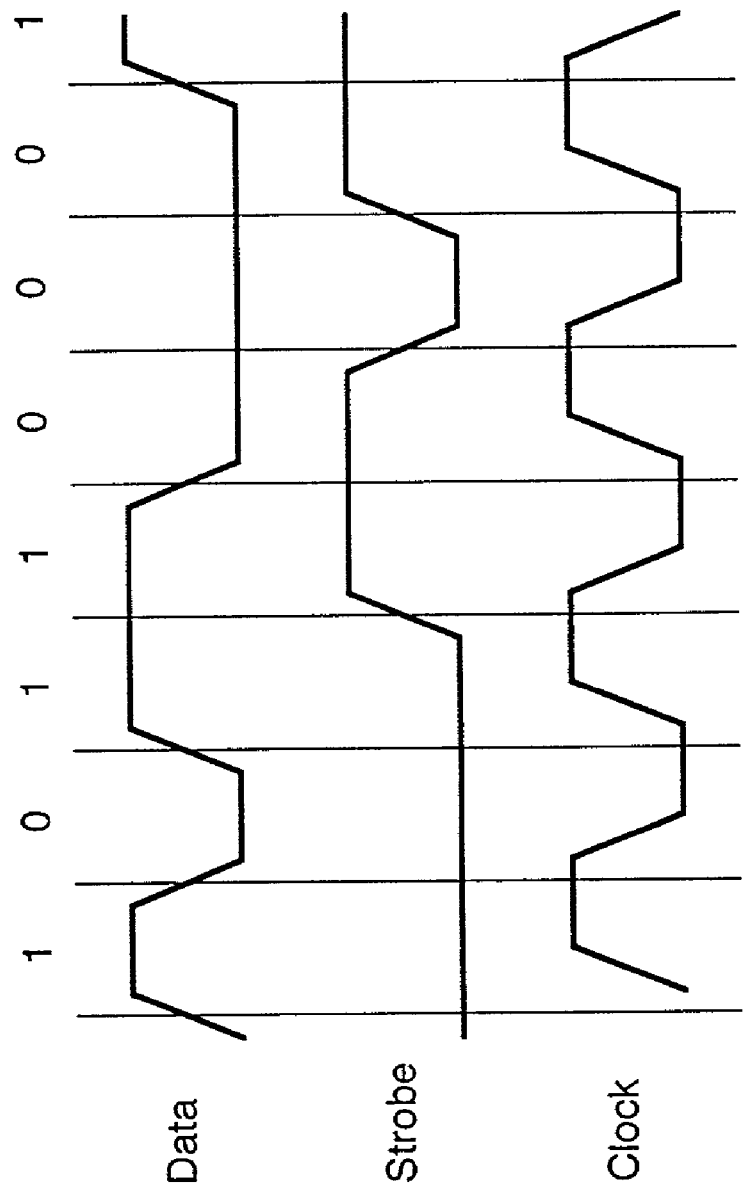
FIG. 13 is a view showing a DS-link coding scheme.

The two twisted-pair signal lines transmit information signals encoded by a DS-link (Data/Strobe link) coding scheme. FIG. 13 is a view for explaining the DS-link coding scheme in the first embodiment.

The DS-link coding scheme shown in FIG. 13 is suitable for high-speed serial data communication, and requires two twisted-pair lines. One twisted-pair line transmits a data signal, whereas the other twisted-pair line transmits a strobe signal. The receiving side can regenerate a clock by exclusive-ORing the data and strobe signals received from the two signal lines.

The 1394 interface using the DS-link coding scheme attains the following advantages:

① The transfer efficiency is higher than other coding schemes.

② The PLL circuit can be omitted to downsize the controller LSI.

③ Information representing an idle state need not be transmitted, so that the transceiver circuit can easily change to a sleep state to reduce the power consumption.

(5) Bus Reset Function

The 1394 interface of each node can automatically detect a change in network connection configuration. In this case, the 1394 network executes processing called bus reset by the following procedures. A change in connection configuration can be detected by a change in bias voltage applied to the communication port of each node.

A node which has detected a change in network connection configuration (e.g., an increase/decrease in the number of nodes upon insertion/removal of a node or ON/OFF operation of a node), or a node which must recognize a new connection configuration transmits a bus reset signal onto the bus via the 1394 interface.

The 1394 interface of a node which has received the bus reset signal transmits occurrence of bus reset to its link layer 304, and transfers the bus reset signal to another node. A node which has received the bus reset signal clears the recognized network connection configuration and the node ID assigned to each device. After all the nodes detect the bus reset signal, each node automatically performs initialization processing (recognition of a new connection configuration and assignment of a new node ID) accompanying bus reset.

Note that bus reset can be activated not only by a change in connection configuration described above, but also by directly issuing an instruction from the application layer 307 to the physical layer 303 under host control.

After bus reset occurs, data transfer temporarily suspends, and then restarts in a new network after completion of initialization processing accompanying bus reset.

(6) Description of Sequence After Occurrence of Bus Reset

After bus reset occurs, the 1394 interface of each node automatically executes recognition of a new connection configuration and assignment of a new node ID. A basic sequence from the start of bus reset to assignment processing of a node ID will be explained with reference to FIGS. 14 to 16.

Figure 14:
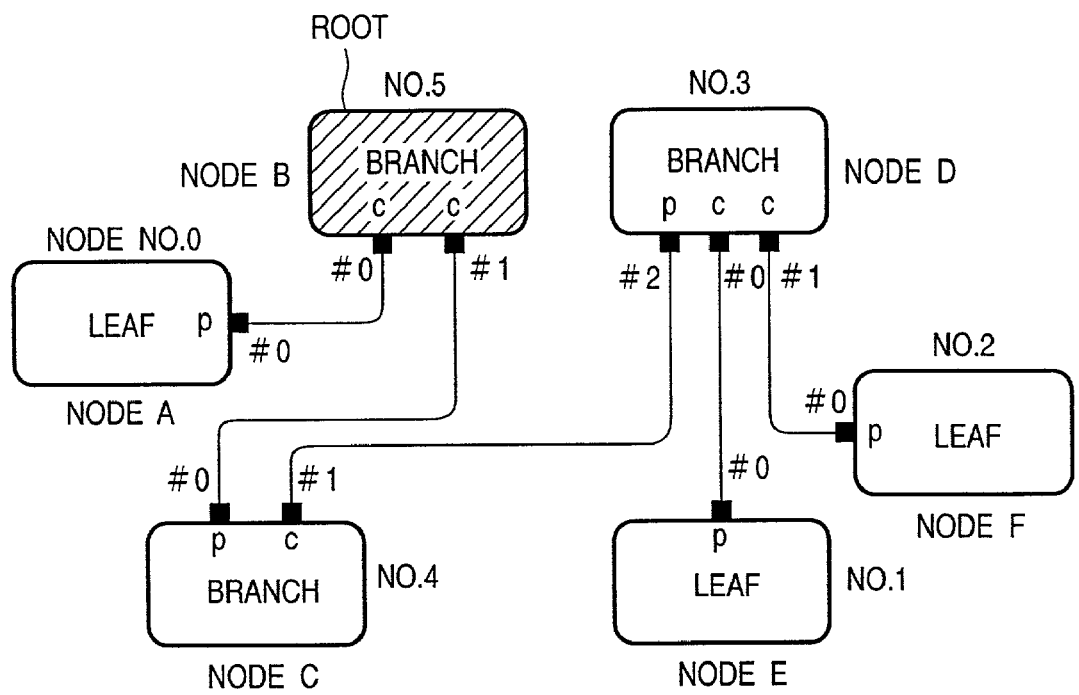
FIG. 14 is a view for explaining a state after activation of bus reset in the 1394 network.

FIG. 14 is a view for explaining a state after occurrence of bus reset in the 1394 network of FIG. 2.

In FIG. 14, node A comprises one communication port; node B, two communication ports; node C, two communication ports; node D, three communication ports; node E, one communication port; and node F, one communication port. The communication port of each node has a port number for identifying each port.

Figure 15:
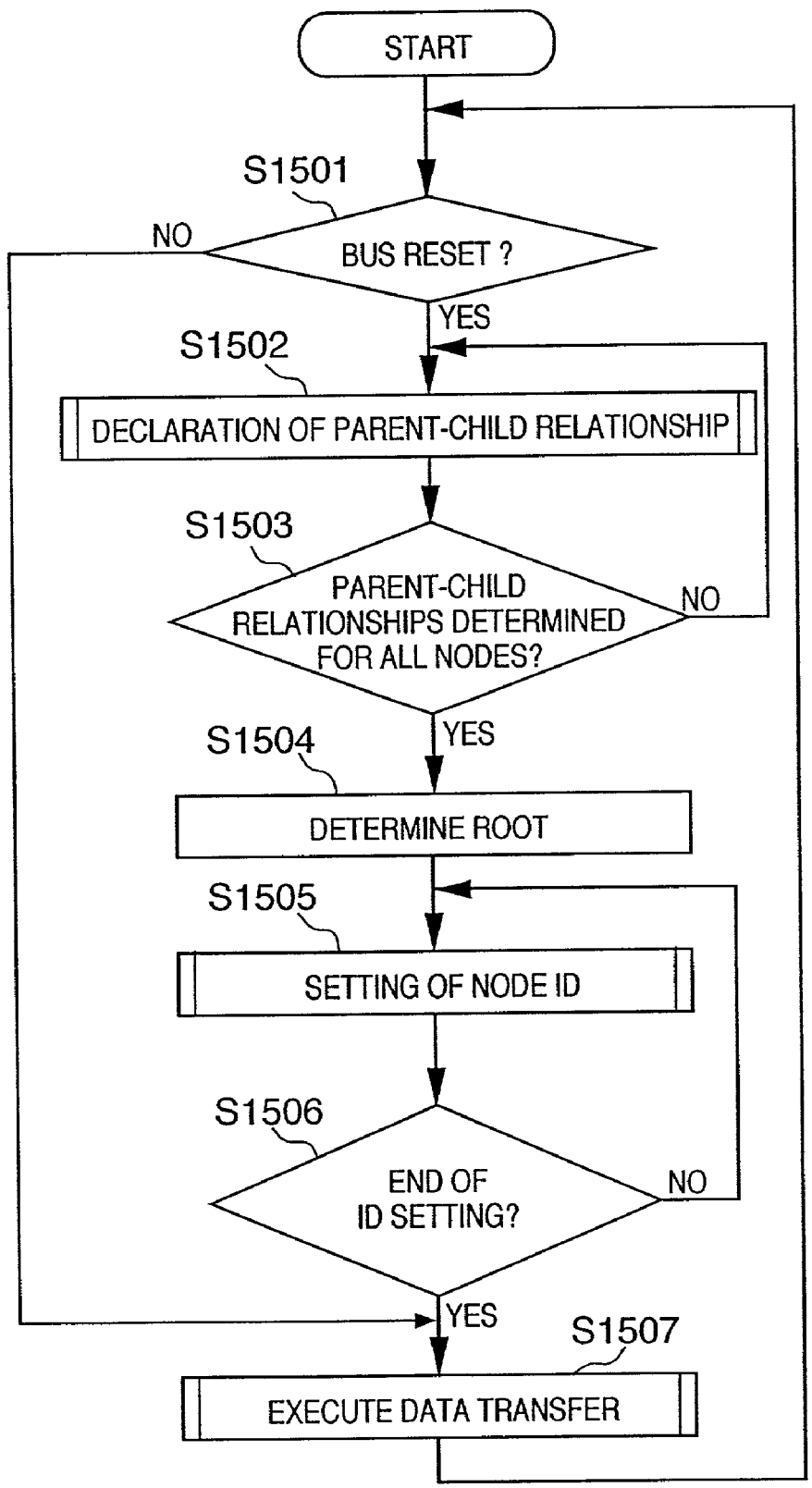
FIG. 15 is a flow chart showing processing from the start of bus reset to assignment of a node ID.

Processing from the start of bus reset to assignment of a node ID in FIG. 14 will be explained with reference to the flow chart of FIG. 15. FIG. 15 is a flow chart showing processing from the start of bus reset to assignment of a node ID in the first embodiment.

Nodes A to F shown in FIG. 14 that constitute a 1394 network always monitor whether bus reset occurs, as shown in step S1501. If a node which has detected a change in connection configuration outputs a bus reset signal, each node detects bus reset to execute processing from step S1502.

If bus reset is detected, the flow advances from step S1501 to step S1502, and respective nodes declare parent-child relationships between their communication ports after occurrence of bus reset. In step S1503, whether parent-child relationships between all the nodes are determined is checked. If NO in step S1503, the flow returns to step S1502, and each node repeats processing in step S1502 until parent-child relationships between all the nodes are determined.

After parent-child relationships between all the nodes are determined, the flow shifts from step S1503 to step S1504. In step S1504, the 1394 network determines a node, i.e., root which performs network arbitration. After the root is determined, the flow shifts to step S1505, and the 1394 interface of each node executes an operation of automatically setting the self node ID. In step S1506, whether node IDs have been set for all the nodes to complete ID setting processing is checked. If NO in step S1506, the flow returns to step S1505, and each node sets an ID for the next node based on predetermined procedures.

After node IDs are set for all the nodes, the flow advances from step S1506 to step S1507, and each node executes isochronous transfer or asynchronous transfer. After data transfer ends, the 1394 interface of each node returns to step S1501 to monitor bus reset.

By the above procedures, the 1394 interface of each node can automatically execute recognition of a new connection configuration and assignment of a new node ID every time bus reset occurs.

(7) Determination of Parent-Child Relationship

Figure 16:
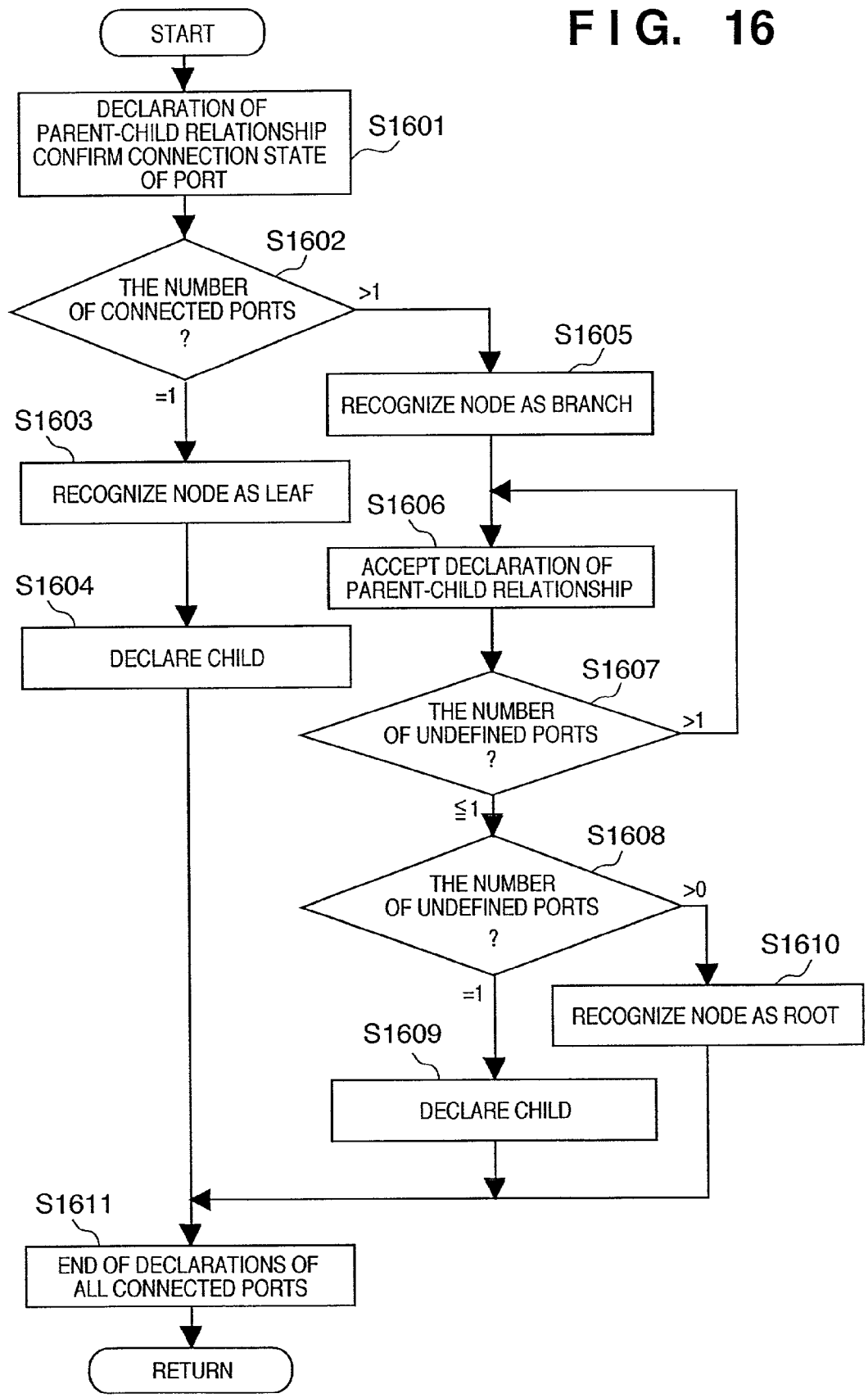
FIG. 16 is a flow chart showing details of parent-child relationship declaration processing in step S1502 shown in FIG. 15.

Details of parent-child relationship declaration processing (i.e., processing of recognizing parent-child relationships between nodes) in step S1502 shown in FIG. 15 will be described with reference to the flow chart of FIG. 16. FIG. 16 is a flow chart showing details of parent-child relationship declaration processing in step S1502 shown in FIG. 15 in the first embodiment.

In parent-child relationship declaration processing of the first embodiment, nodes A to F on the 1394 network confirm the connection states (connection or disconnection) of the self communication ports upon occurrence of bus reset in step S1601 shown in FIG. 16. After confirming the connection state of the communication port, each node counts in step S1602 the number of communication ports (to be referred to as connected ports) connected to other nodes, and checks whether the number of connected ports is one.

If the number of connected ports is one in step S1602, the flow shifts to step S1603, and the node recognizes itself as a "leaf". The "leaf" means a node connected to only one node. In step S1604, the node serving as a leaf declares a "child" to a node connected to the connected port. At this time, the leaf recognizes that the connected port is a "parent port (communication port connected to a parent node)". After that, the flow advances to step S1611.

Parent-child relationships are sequentially declared between a branch and a leaf serving as a network terminal end, and then between branches. The parent-child relationships between nodes are determined in the order of a communication port which can make a declaration early. A communication port which declares a child is recognized as a "parent port" between nodes, and a communication port which has received the declaration is recognized as a "child port (communication port connected to a child node)". For example, in FIG. 14, nodes A, E, and F recognize themselves as leaves, and declare child-parent relationships. Then, nodes A and B are determined to be a child and parent; nodes E and D, a child and parent; and nodes F and D, a child and parent.

If the number of connected ports is not one but two or more as a result of processing in step S1602, the flow shifts to step S1605, and the node recognizes itself as a "branch". The "branch" means a node connected to two or more nodes. In step S1606, the node serving as a branch receives declaration of a parent-child relationship from a node at each connected port. The connected port which has received the declaration is recognized as a "child port".

After one connected port is recognized as a "child port", the flow advances to step S1607, and the branch detects whether there are two or more connected ports (i.e., undefined ports) for which parent-child relationships have not been determined yet. If YES in step S1607, the flow returns to processing in step S1606, and the branch receives declaration of a parent-child relationship from a node at each connected port again.

If NO in step S1607, the flow shifts to step S1608, and the branch checks whether only one undefined port exists. If YES in step S1608, the branch recognizes the undefined port as a "parent port", and declares a "child" to a node connected to the port in step S1609. Then, the flow advances to step S1611.

The branch cannot declare a child to another node until the number of remaining undefined ports decreases to one. For example, in the configuration of FIG. 14, nodes B, C, and D recognize themselves as branches, and receive declarations from leaves or other branches. Node D declares a parent-child relationship to node C after parent-child relationships between D and E and between D and F are determined. Node C which has received the declaration from node D declares a parent-child relationship to node B.

If NO in step S1608 (i.e., all the connected ports of the branch are parent ports), the flow shifts to step S1610, and the branch recognizes itself as a root. For example, in FIG. 14, node B in which all the connected ports are parent ports is recognized by other nodes to be a root for arbitrating communication on the 1394 network.

In this case, node B is determined to be a root. If the timing at which node B declares a parent-child relationship is earlier than the timing at which node C declares a parent-child relationship, another node may become a root. Hence, even the same network configuration does not always use the same node as a root.

After the parent-child relationships of all the connected ports are declared, each node can recognize the connection configuration of the 1394 network as a hierarchical structure (tree structure). The declarations at all the connected ports end in step S1611, and the flow returns to the main routine. Note that the parent node is an upper node in the hierarchical structure, and the child node is a lower node in the hierarchical structure.

(8) Assignment of Node ID

Figure 17A:
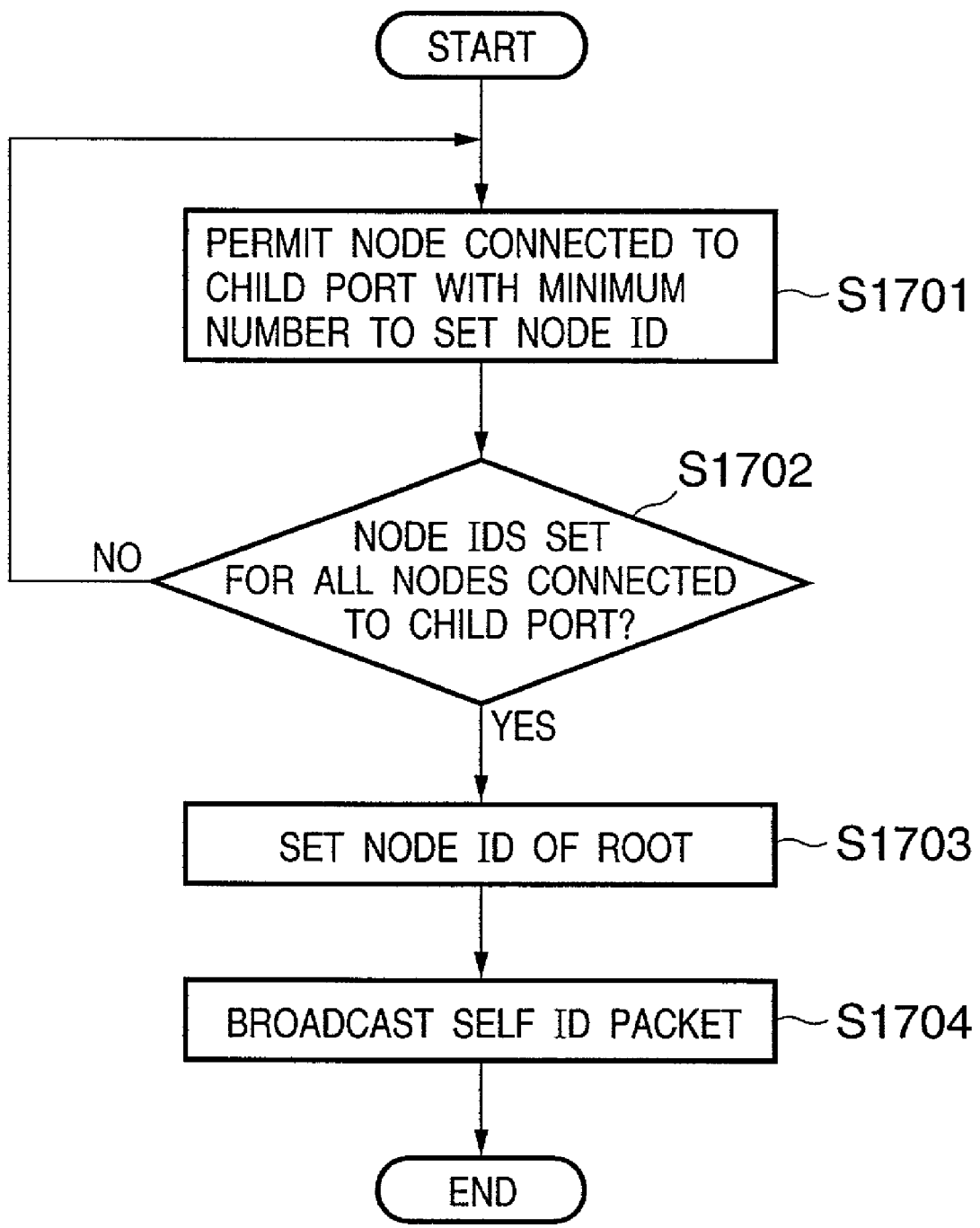
FIGS. 17A and 17B are flow charts showing details of node ID setting processing in step S1505 shown in FIG. 15.
Figure 17B:
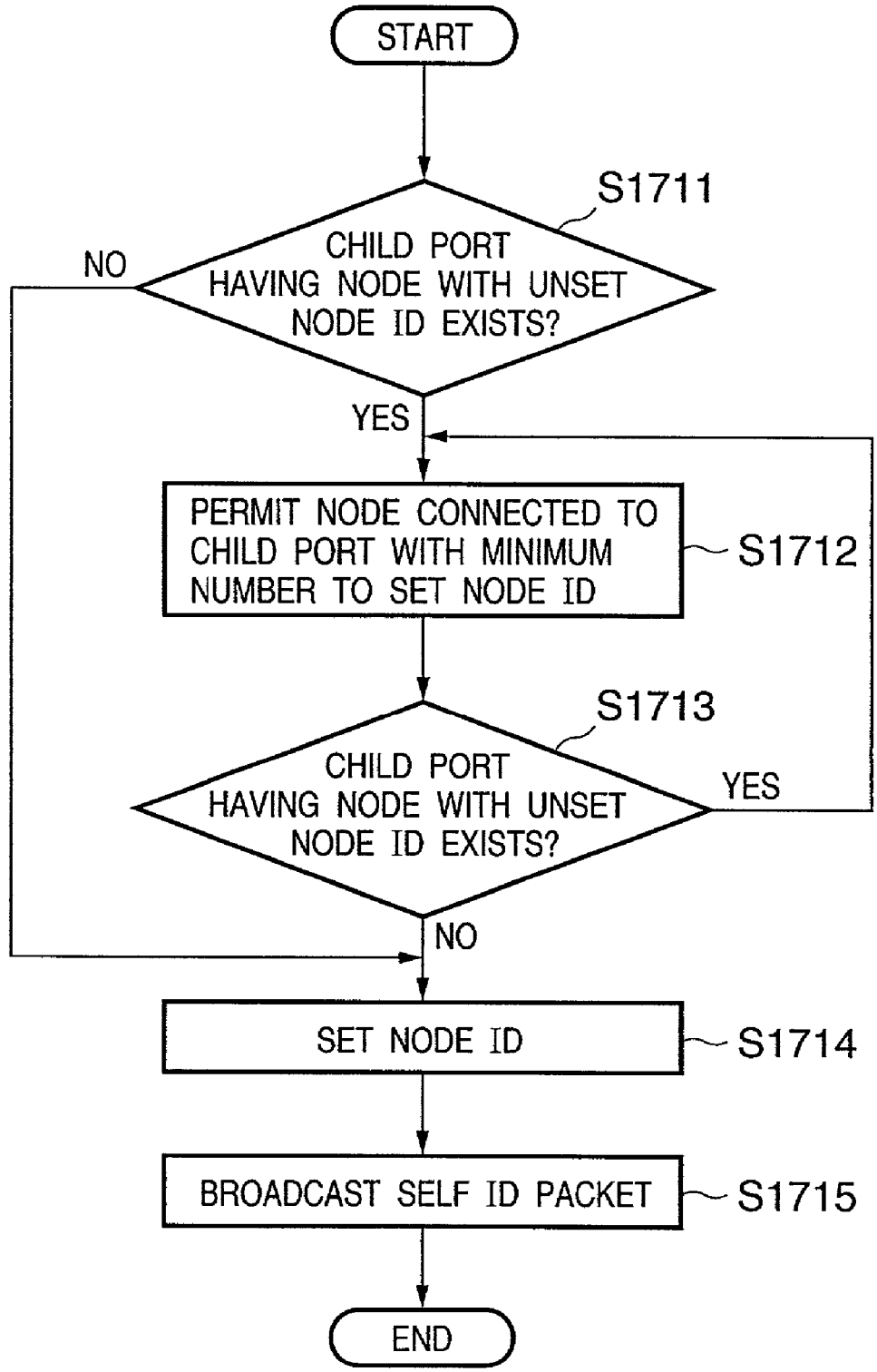

FIGS. 17A and 17B are flowcharts showing the processing to set the node ID in step S1505, i.e., to assign the node IDs to the respective nodes. FIG. 17A shows processing by the root, and FIG. 17B, processing by the nodes other than the root. As described above, the node ID has a bus number and a node number. In the present embodiment, on the assumption that the respective nodes exist on the same bus, the same bus number is assigned to the respective nodes.

In step S1701, the root gives a node ID setting permission to a node connected to a communication port having a minimum port number among child ports connected to nodes with unset node IDs. Next, in step S1702, the root determines whether or not node IDs have been set for all the nodes connected to the child ports. If a node with unset ID exists, step S1701 is repeated. That is, when the node IDs have been set for all the nodes connected to the communication port having the minimum port number, the root determines the child port as ID-setting completed port, and performs similar control on a node connected to a communication port having the next minimum port number.

When the node IDs have been finally set for all the nodes connected to the child ports, the root sets its own node ID in step S1703, and in step S1704, broadcasts a self ID packet to be described later. Note that the node numbers included in the node IDs are 0, 1, 2, . . . , from a leaf to a branch. Accordingly, the root has the greatest node number.

On the other hand, in step S1711 in FIG. 17B, the node, which obtained the node ID setting permission from the root, determines whether or not a child port including a node with an unset node ID exists. If such child port exists, the node gives a node ID setting permission to a node connected to the child port in step S1712. The node that obtained the node ID setting permission also performs the processing in FIG. 17B.

Then in step S1713, the node again determines whether or not a child port including a node with an unset node ID exists. If it is determined in step S1711 or S1713 that no child port including a node with an unset node ID exists, the node sets its own node ID in step S1714, and in step S1715, broadcasts a self ID packet including information on its node number and communication port connection status and the like.

Broadcast means transfer of communication packet of one node to all the indefinite number of other nodes constructing the 1394 network. Each node receives self ID packets, thereby recognizes the node numbers assigned to the other nodes, and obtains a node number assignable to the node itself.

For example, in FIG. 14, the node B as the root first gives a node ID setting permission to the node A connected to the communication port with the minimum port number "#0". The node A assigns its node number "0" and sets its node ID, and broadcasts a self ID packet including the node ID.

Next, the root gives a node ID setting permission to the node C connected to the communication port with the port number "#1". The node C gives a node ID setting permission to the node D connected to the communication port with the port number "#1". The node D gives a node ID setting permission to the node E connected to the communication port with the port number "#0". When the node E has set a node ID, the node D gives a node ID setting permission to the node F connected to the communication port with the port number "#1". In this manner, node IDs are set for all the nodes in this procedure.

By this processing, the 1394 network can automatically assign a node ID to each node.

(8-1) Self ID packet

Figure 18:
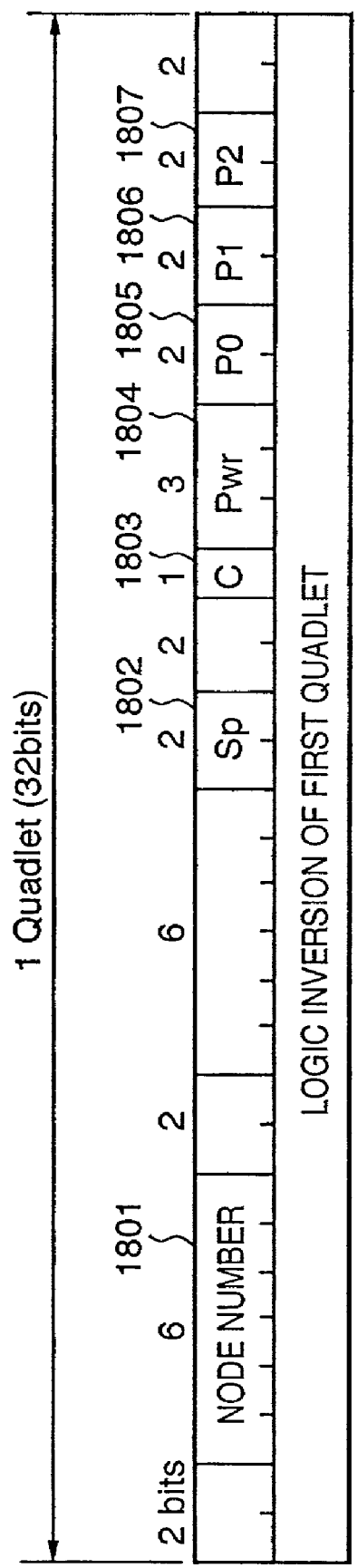
FIG. 18 is a view showing a format of a self ID packet.

FIG. 18 shows a format of a self ID packet output in step S1706. In FIG. 18, reference numeral 1801 denotes a field for storing the node number of a node which has sent a self ID packet; 1802, a field for storing information about a compatible transfer speed; 1803, a field representing the presence/absence of a bus management function (the presence/absence of a bus manager ability); and 1804, a field for storing information about power consumption and supply characteristics.

In FIG. 18, reference numeral 1805 denotes a field for storing information about the connection state of a communication port having a port number "#0" (connection, disconnection, parent-child relationship of a communication port, and the like); 1806, a field for storing information about the connection state of a communication port having a port number "#1" (connection, disconnection, parent-child relationship of a communication port, and the like); and 1807, a field for storing information about the connection state of a communication port having a port number "#2" (connection, disconnection, parent-child relationship of a communication port, and the like).

When a node which sends a self ID packet has a bus manager ability, a contender bit in the field 1803 is set to "1"; otherwise, to "0".

(8-2) Bus Manager

The bus manager is a node having a function of performing, based on various pieces of information contained in the above-mentioned self ID packet, bus power supply management (manage, for each node, information representing whether power can be supplied via a communication cable and whether power must be supplied), speed information management (manage the maximum transfer speed between nodes from information about a compatible transfer speed of each node), topology map information management (manage the network connection configuration from parent-child relationship information of a communication port), and bus optimization based on topology map information, and a function of providing these pieces of information to other nodes. These functions allow the node serving as a bus manager to manage the bus over the 1394 network.

If a plurality of nodes have a bus manager ability after node ID setting processing, a node having the largest node number serves as a bus manager. That is, when a root having the largest node number in the network has a bus manager function, the root serves as a bus manager.

If, however, the root does not have this function, a node having the largest node number next to the root serves as a bus manager. Which node becomes a bus manager can be grasped by checking the contender bit 1803 in a self ID packet broadcasted by each node.

(9) Arbitration Function

Figure 19A:
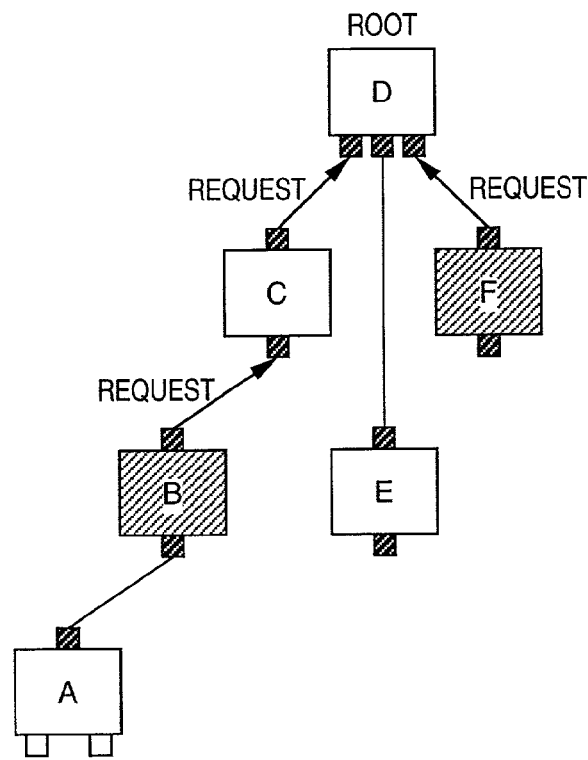
FIGS. 19A and 19B are views for explaining arbitration in the 1394 network.
Figure 19B:
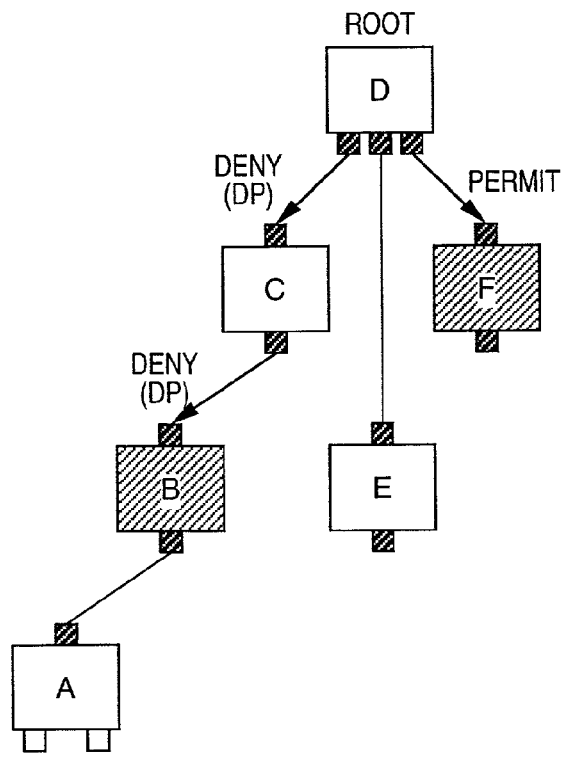

FIGS. 19A and 19B are views for explaining arbitration in the 1394 network shown in FIG. 2.

The 1394 network always performs bus access arbitration prior to data transfer. The 1394 network is a logical bus type network, and can transfer the same communication packet to all the nodes in the network by relaying a communication packet transferred from each node to another node. To prevent collision of communication packets, arbitration must be executed, which allows only one node to transfer a packet at given timing.

FIG. 19A is a view for explaining a case wherein nodes B and F issue bus access requests.

When arbitration starts, nodes B and F issue bus access requests to their parents. A parent (i.e., node C) which has received the request from node B relays the bus access request to its parent node (i.e., node D). This request is finally sent to a root (node D) which finally executes arbitration.

The root which has received the bus access requests determines which node can use the bus. This arbitration operation can be done by only a node serving as a root, and a node which wins arbitration is permitted to use the bus.

FIG. 19B is a view showing a case wherein a request from node F is permitted, and a request from node B is denied.

The root transmits a DP (Data Prefix) packet to a node which loses in arbitration, and notifies the node of denial. The denied node holds a bus access request until the next arbitration.

By controlling arbitration, the 1394 network can manage bus access.

(10) Communication Cycle

The asynchronous and isochronous transfer modes can be mixed in time division in each communication cycle period. In general, the communication cycle period is 125 µS long.

Figure 20:
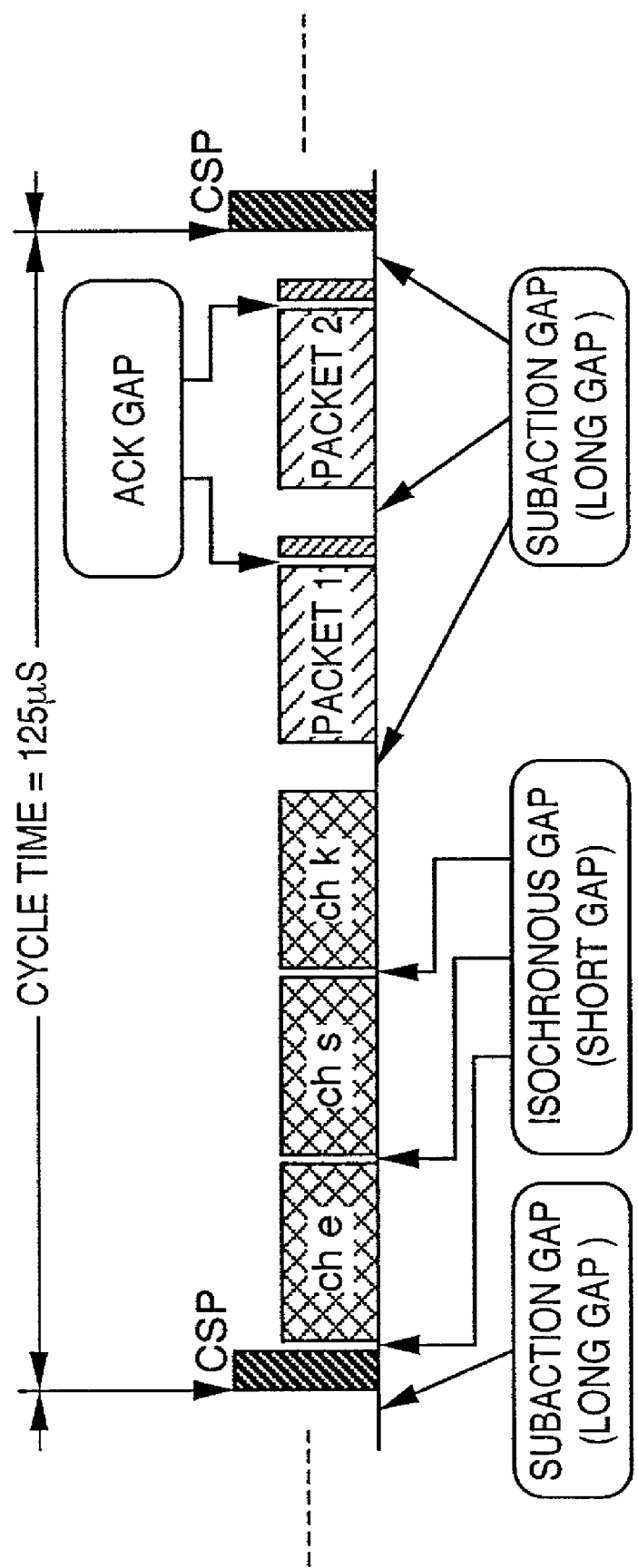
FIG. 20 is a view for explaining a case wherein asynchronous and isochronous transfer modes are mixed in one communication cycle.

FIG. 20 is a view for explaining a case wherein the asynchronous and isochronous transfer modes are mixed in one communication cycle.

The isochronous transfer mode is executed preferentially to the asynchronous transfer mode. This is because an idle period (subaction gap) necessary for activating asynchronous transfer after a cycle start packet is set longer than an idle period (isochronous gap) necessary for activating isochronous transfer. Thus, isochronous transfer is executed preferentially to asynchronous transfer.

In FIG. 20, a cycle start packet (to be referred to as a "CSP" hereinafter) is transferred from a predetermined node at the start of each communication cycle. Each node can count the same time as another node by adjusting the time using the CSP.

(11) Isochronous Transfer Mode

The isochronous transfer mode is an isochronous type transfer scheme. Isochronous mode transfer can be executed in a predetermined period after the start of a communication cycle. The isochronous transfer mode is always executed every cycle in order to maintain real-time transfer.

The isochronous transfer mode is a transfer mode suitable for transfer of data such as moving picture data or audio data which requires real-time transfer. The isochronous transfer mode is broadcasting communication, unlike one-to-one communication in the asynchronous transfer mode. That is, a packet sent from a given node is transferred to all the nodes on the network. Note that isochronous transfer does not use any ack (acknowledge).

In FIG. 20, channel e (ch e), channel s (ch s), and channel k (ch k) represent periods during which nodes perform isochronous transfer. The 1394 interface uses different channel numbers in order to discriminate a plurality of different isochronous transfer operations. This enables isochronous transfer between a plurality of nodes. In this case, the channel number does not specify a transmission destination, but only gives a logical number to data.

The isochronous gap shown in FIG. 20 represents a bus idle state. Upon the lapse of a predetermined time in this idle state, a node which desires isochronous transfer determines that it can use the bus, and executes arbitration.

Figure 21:
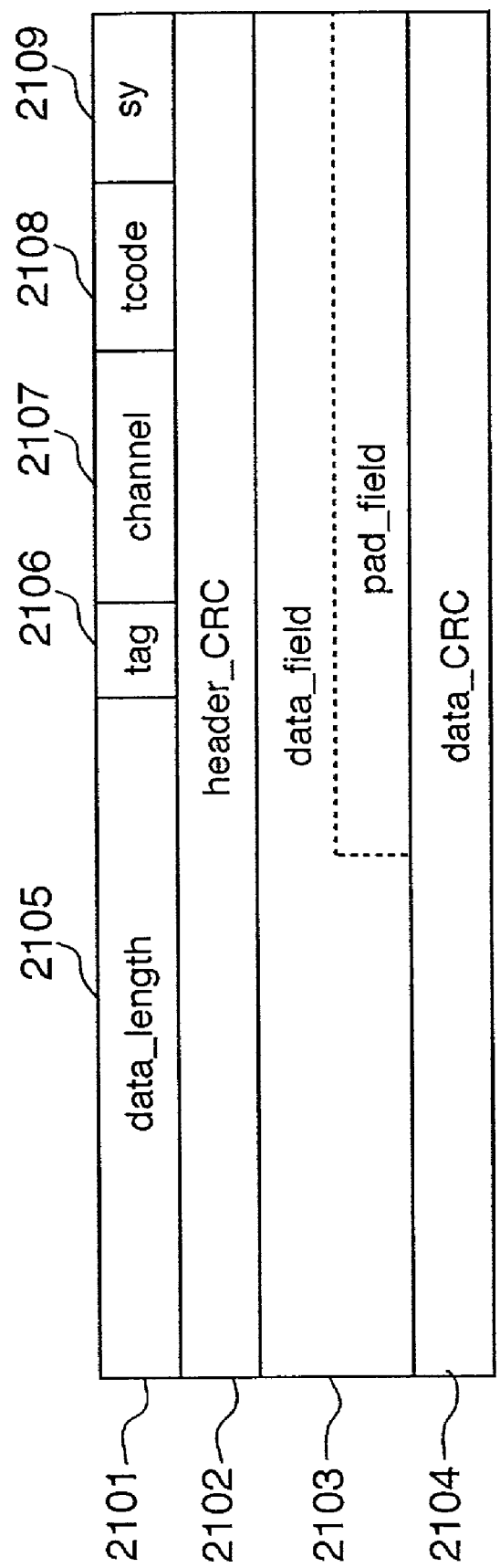
FIG. 21 is a view showing the format of a communication packet transferred based on the isochronous transfer mode.

FIG. 21 shows the format of a communication packet transferred based on the isochronous transfer mode in the first embodiment. The communication packet transferred based on the isochronous transfer mode will be called an isochronous packet.

In FIG. 21, the isochronous packet is made up of a header 2101, header CRC 2102, data 2103, and data CRC 2104.

The header 2101 includes a field 2105 for storing the data length of the data 2103, a field 2106 for storing format information of the isochronous packet, a field 2107 for storing the channel number of the isochronous packet, a field 2108 for storing a packet format and a transaction code (tcode) for identifying processing which must be executed, and a field 2109 for storing an isochronous code.

(12) Asynchronous Transfer Mode

The asynchronous transfer mode is an asynchronous type transfer scheme. Asynchronous transfer is one-to-one communication from a self node to a partner node, and can be executed until the next communication cycle starts (i.e., the CSP of the next communication cycle is transferred) after the end of an isochronous transfer period.

In FIG. 20, the first subaction gap represents a bus idle state. After the idle time reaches a predetermined value, a node which desires asynchronous transfer determines that it can use the bus, and executes arbitration.

Figure 22:
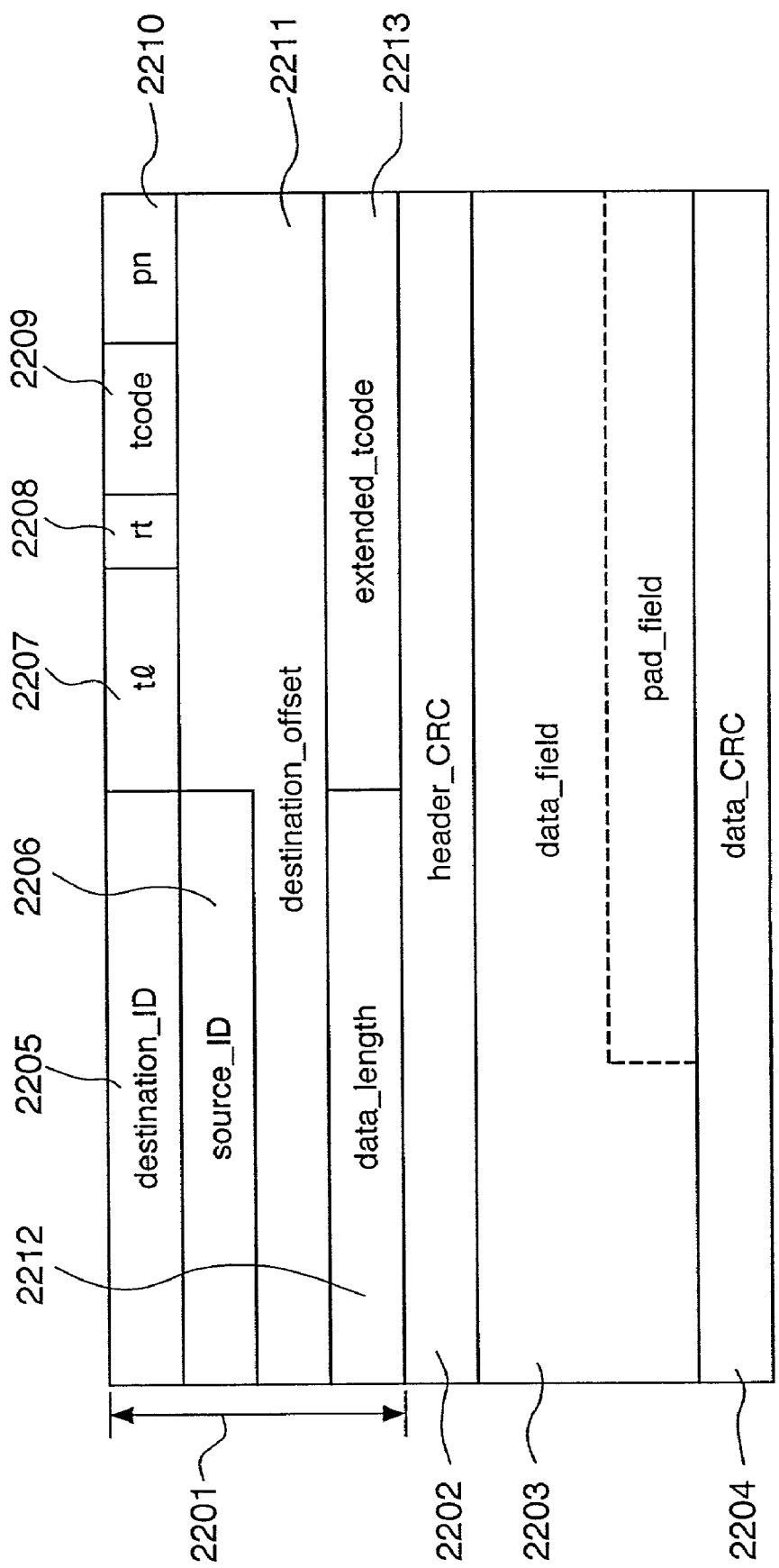
FIG. 22 is a view showing the format of a communication packet based on the asynchronous transfer mode.

The node which gains bus access by arbitration transfers a packet shown in FIG. 22 to a predetermined node. The node which has received this packet returns ack (acknowledge) or response packet subsequently to ack gap.

FIG. 22 is a view showing the format of a communication packet based on the asynchronous transfer mode in the first embodiment. The communication packet transferred based on the asynchronous transfer mode will be called an asynchronous packet.

In FIG. 22, the asynchronous packet is made up of a header 2201, header CRC 2202, data 2203, and data CRC 2204.

In the header 2201, a field 2205 stores the node ID of a destination node; a field 2206, the node ID of a source node; a field 2207, a label representing a series of transactions; a field 2208, a code representing a retransmission status; a field 2209, a packet format and a transaction code (tcode) for identifying processing which must be executed; a field 2210, priority; a field 2211, the memory address of a destination; a field 2212, the length of data; and a field 2213, an extended transaction code.

A packet transferred from a transferring node in asynchronous transfer is transmitted to all the nodes in the network, but the nodes ignore packets except for ones designated to the self addresses. Thus, only a destination node can read the packet.

When asynchronous transfer reaches time at which the next CSP should be transferred, the next CSP is transmitted after the end of transfer without forcibly stopping transfer. If one communication cycle continues for 125 µS or more, the next communication cycle is shortened. This enables the 1394 network to hold an almost constant communication cycle.

(13) 1394 interface unit

Figure 23:
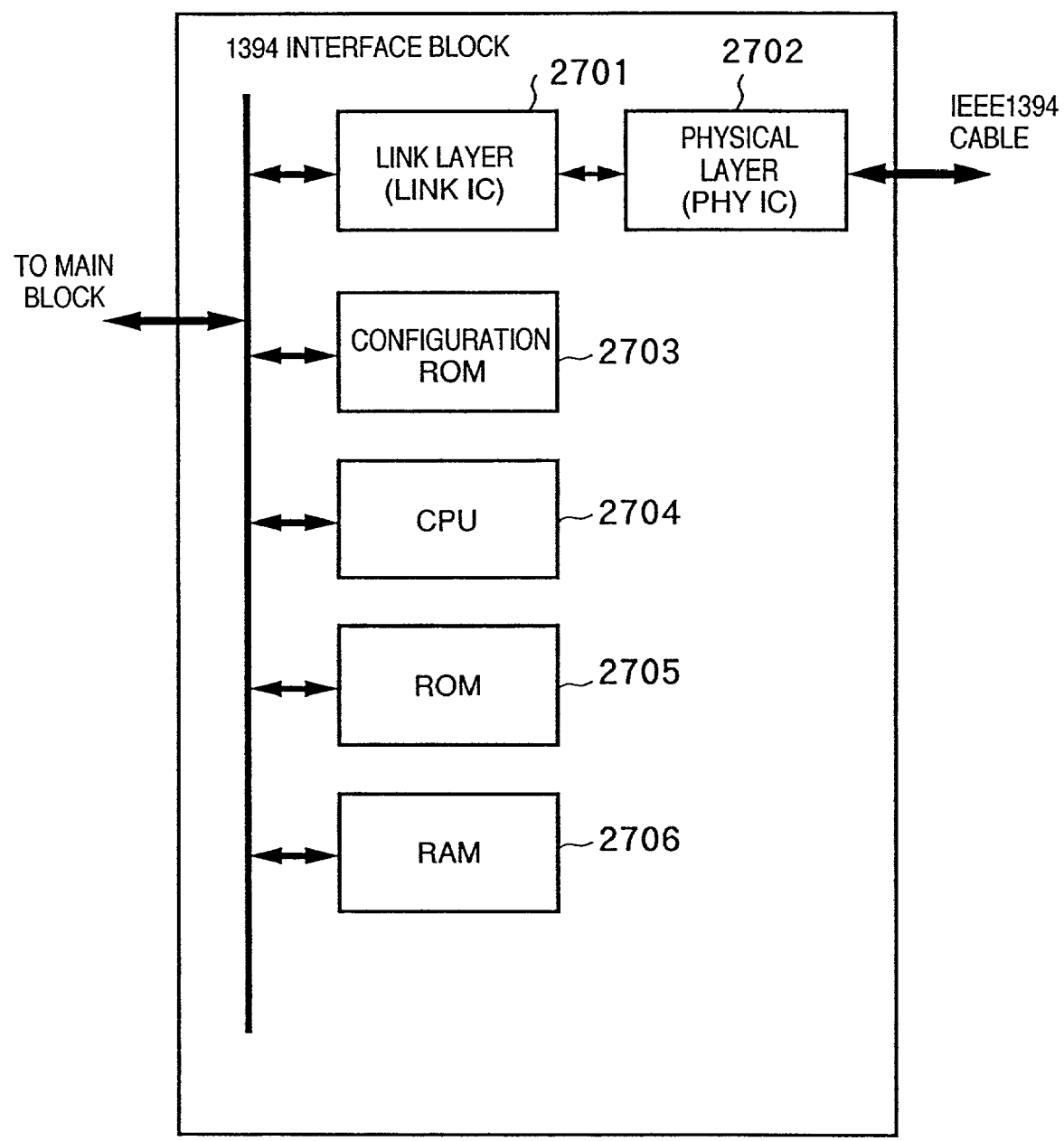
FIG. 23 is a block diagram showing the arrangement of the 1394 interface block of a 1394 node in the first embodiment.

The configuration of a 1394 serial bus interface common to respective nodes connected to each local bus will be explained with reference to FIG. 23. FIG. 23 is a block diagram showing the arrangement of the 1394 interface block of a 1394 node in this embodiment.

In FIG. 23, reference numeral 2701 denotes a link layer control IC (LINK IC) which interfaces a device main body, controls data transfer of a PHY IC, and realizes the function of the link layer described above. The main function of this IC includes a transmission/reception FIFO function of temporarily storing transmission/reception data via the PHY IC, a function of packeting transmission data, a function of determining whether the PHY IC is suitable for an assigned channel when reception data has the self node address or is isochronous transfer data, a receiver function of performing error check for the data, and a function of interfacing the device main body.

Reference numeral 2702 denotes a physical layer control IC (PHY IC) for directly driving the 1394 serial bus. The physical layer control IC 2702 realizes the function of the physical layer described above. The main function of this IC includes bus initialization, arbitration, encoding/decoding of a transmission data code, monitoring of a cable ON state, supply of a load termination type power source (for recognizing active connection), and an interface with a link layer IC.

Reference numeral 2703 denotes a configuration ROM which stores identification and communication conditions unique to each device. The data format of this ROM complies with a format defined by the IEEE 1212 and IEEE 1394 standards, as described above.

Reference numeral 2704 denotes a CPU for controlling 1394 interfaces such as the link layer IC and PHY IC; 2705, a ROM storing control programs for these interfaces; and 2706, a RAM used for a data buffer for storing transmission/reception data, a control work area, and the data areas of various registers mapped at 1394 addresses.

Figure 24:
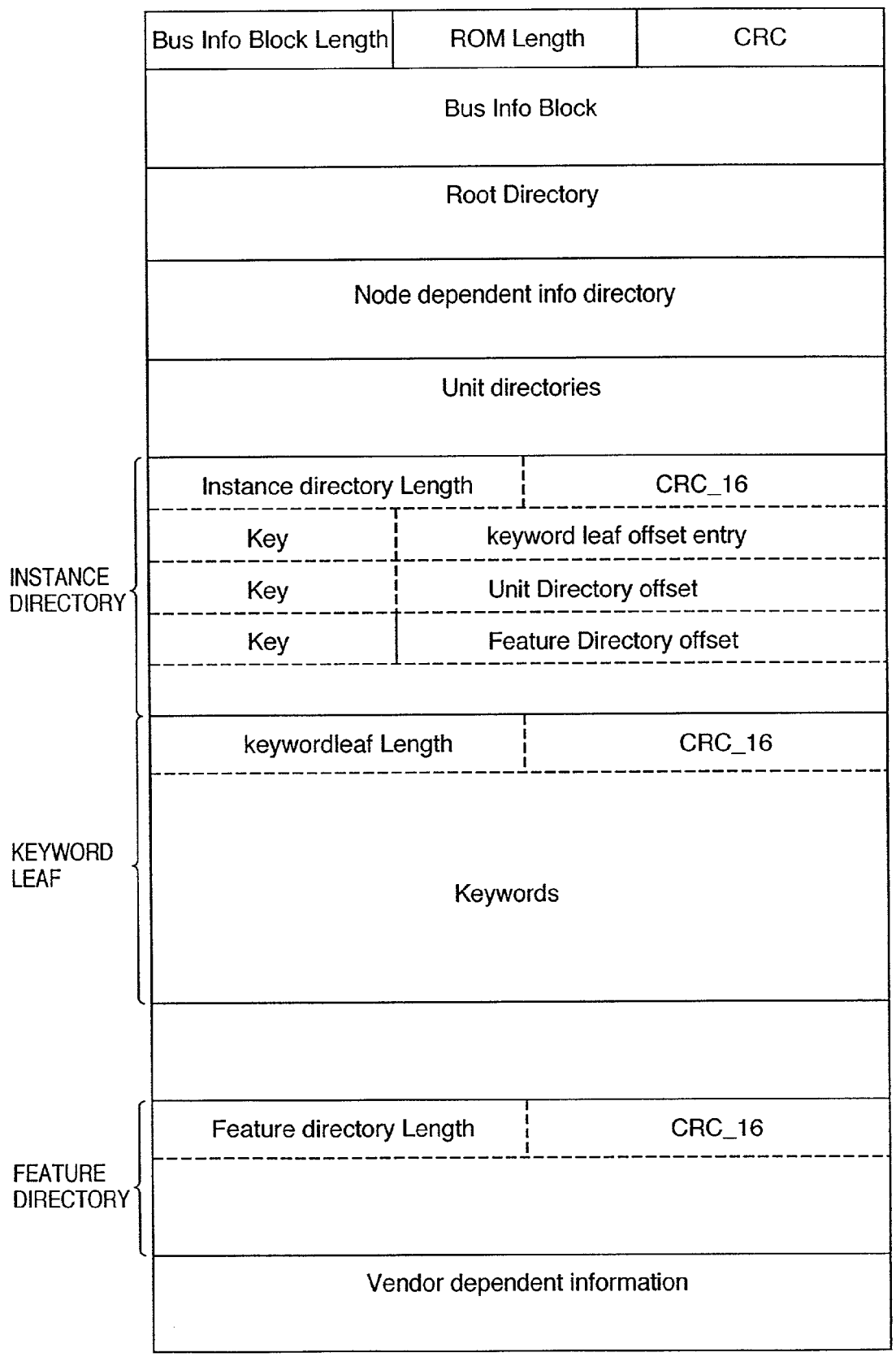
FIG. 24 is a view showing the format of storage data in the configuration ROM.

Each node comprises a configuration ROM of a general format as shown in FIG. 24. Software unit information of each device is stored in a unit directory, whereas node dependent information is stored in a node dependent info directory.

The basic function instance of each device such as a printer function or scanner function, and detailed information accessory to the basic function can be held by an instance directory offset from the root directory.

The format of the instance directory will be described. The instance directory stores information of a device such as a printer or scanner which does not depend on protocols. For a single-function device, basic function information is one. For a device which supports a plurality of functions, a plurality of functions are listed. For each of the listed functions, the instance directory stores pointer information to a unit directory for storing corresponding protocol software information, and a pointer to a feature directory for holding detailed information unique to each function.

Figure 25:
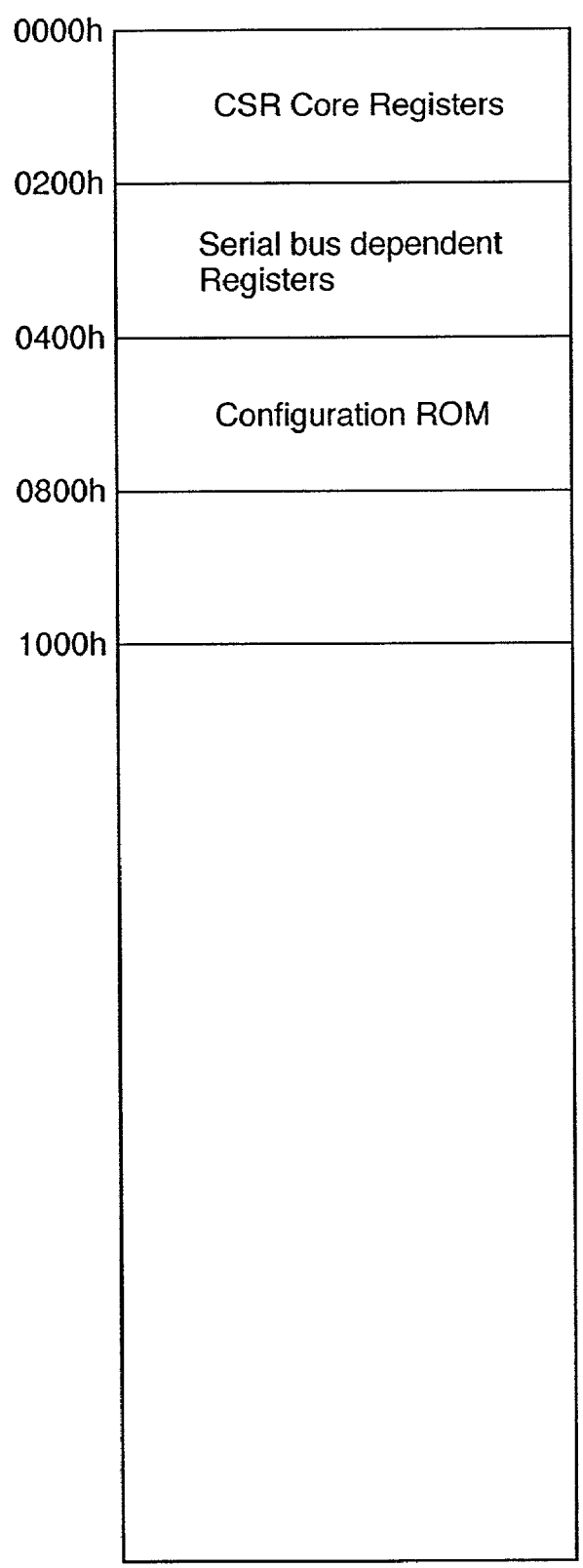
FIG. 25 is a view showing the address space of the 1394 node.

As described above, the last 28 bits out of the address setting of the 1394 serial bus are ensured as the unique data area of each device which can be accessed by another device connected to the serial bus. FIG. 25 is a view showing the address space of the 28-bit area serving as the unique data area of each device.

CSR core registers shown in FIG. 11 are arranged in an area from address 0000 to address 0200 in FIG. 25. These registers exist as basic functions for node management defined by the CSR architecture.

An area from address 0200 to address 0400 is defined by the CSR architecture as an area for storing serial bus dependent registers. The above-mentioned configuration ROM is arranged in an area from address 0400 to address 0800.

An area from address 0800 to address 1000 shown in FIG. 25 stores the current 1394 bus topology information and information about the transfer speed between nodes. An area after address 1000 is called a unit space where registers concerning operations unique to each device are arranged. This area stores registers and a data transfer memory mapped buffer area defined by upper protocols supported by each device, or device dependent registers.

<Detailed Construction of Present Embodiment>

(1) Printer

Figure 26:
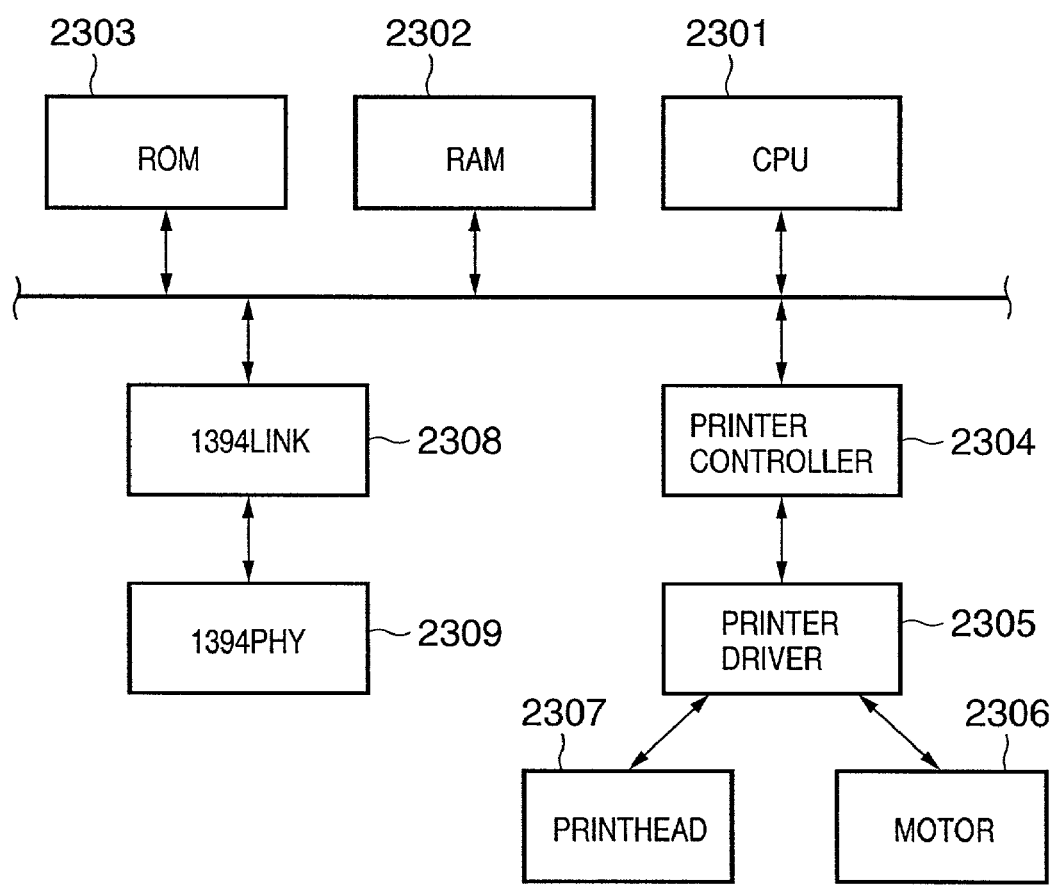
FIG. 26 is a block diagram showing the construction of a printer in FIG. 1.

FIG. 26 is a block diagram showing the construction of the printer 102 in FIG. 1. The printer 102 has an ink-jet printhead 2307.

A CPU 2301 controls the printer 102 in accordance with an execution program stored in a ROM 2303. A RAM 2302 is an internal memory of the printer 102 having a reception area for temporarily storing image data and print data inputted into the printer 102 via the interface, a data area for storing data, converted from print data, for causing the printhead 2307 to discharge corresponding CMYK respective color inks, and a work area used by the CPU 2301 for data processing, and the like. Further, respective blocks in the printer 102 perform various data transfer, control and processing via a system bus in the printer 102.

The basic operation of the printer 102 will be described. The CPU 2301 drives the motor 2306 via the printer controller 2304 and the printer driver 2305, to control a carrier holding the printhead 2307 and a paper feed mechanism. At the same time, the CPU reads data to cause ink discharge from the RAM 2302 and sends the data to the printer controller 2304, and drives the printhead 2307 via the printer driver 2305, thereby executes printing.

Further, the printer 102 has a LINK chip 2308 and a PHY chip 2309 constructing the 1394 interface as an external interface. Accordingly, a visible image can be printed on a print sheet based on image data or print data inputted from an external device via the 1394 network.

(2) Digital Camera

Figure 27:
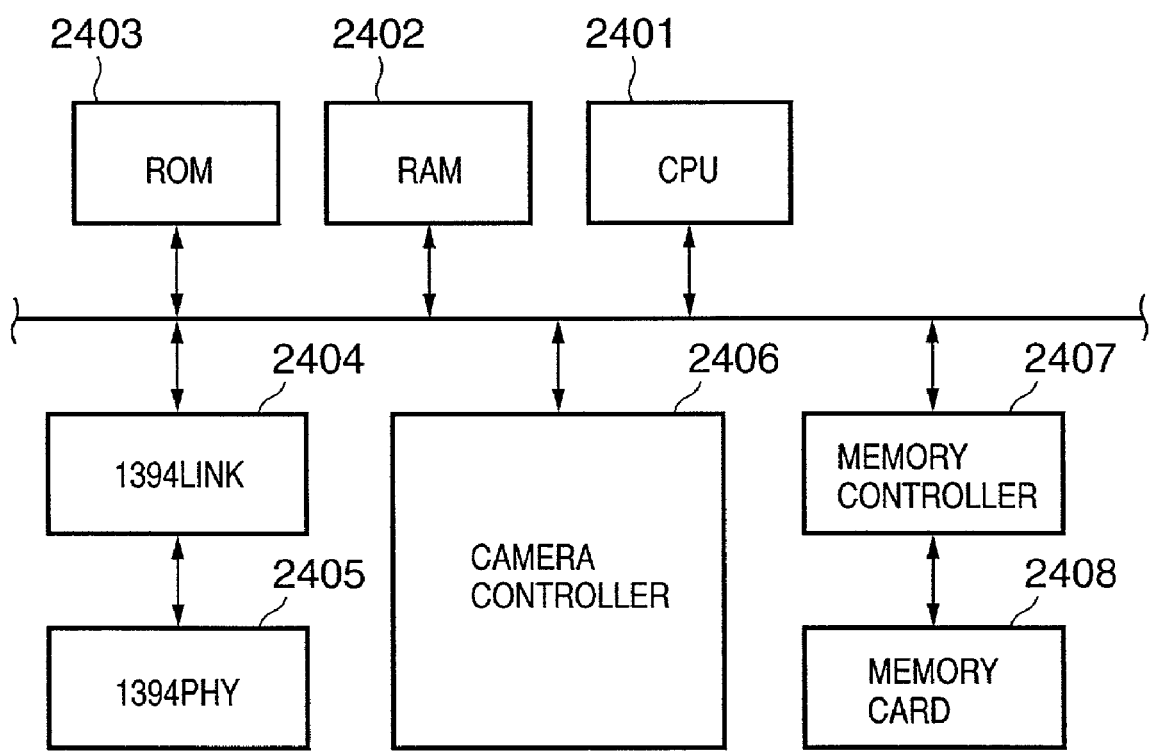
FIG. 27 is a block diagram showing the construction of a digital camera in FIG. 1.

FIG. 27 is a block diagram showing the construction of the digital camera 101 in FIG. 1. In FIG. 27, elements related to image sensing are omitted, and only elements related to image data conversion processing and data transfer are shown.

A CPU 2401 controls respective blocks in the digital camera 101 in accordance with a program stored in a ROM 2403. The CPU 2401 performs various controls and image processing by using a RAM 1402 as a work area, further, performs data transfer by utilizing the RAM 2402 as a temporary memory.

A camera controller 2406 controls devices necessary for image sensing. The camera controller 2406 reads an image from a CCD, displays an obtained image on an LCD, and sets the focus and exposure upon image sensing. Image data obtained by image sensing is stored as e.g. compressed JPEG data in a memory card 2408. As the memory card cannot be directly connected to a system bus and accessed, the card is generally connected to the system bus via a card controller 2407 which performs ATA-type memory card read/write control.

Further, the digital camera 101 has an 1394 interface as an external interface, and transmits image data and print data to an external device via a LINK chip 2404 and a PHY chip 2405.

(3) Set Top Box (STB)

Figure 28:
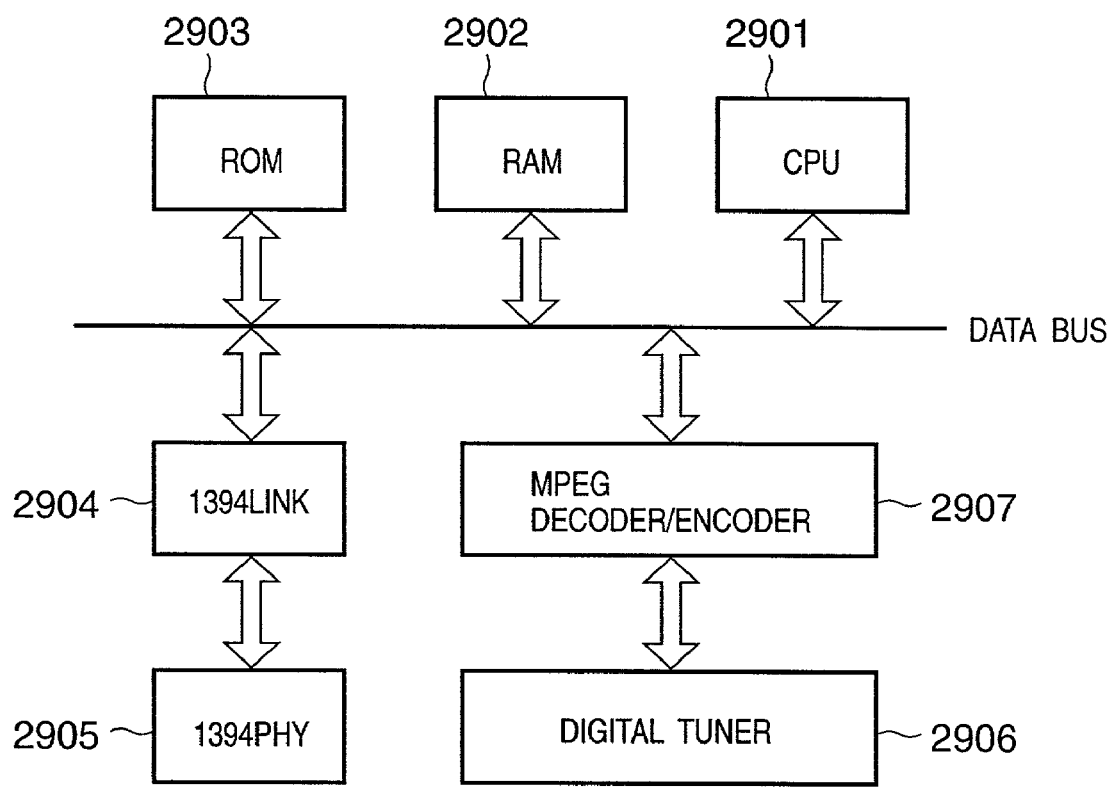
FIG. 28 is a block diagram showing the construction of a STB in FIG. 1.

Hereinbelow, the set top box (STB) 103 in FIG. 1 will be described. FIG. 28 is a block diagram showing the construction of the STB 103. In the figure, the STB 103 has a CPU 2901 for main control, a ROM 2903 in which a control program is written, a RAM 2902 used as a work area for the CPU, a digital broadcast tuner 2906, and an MPEG encoder/decoder 2907 which encodes/decodes MPEG format broadcast data. Further, as the STB has a 1394 serial bus as an external interface, a LINK-IC 2904 and PHY-IC 2905 are connected to a data bus.

The main function of the STB 103 is a digital broadcast tuner. As video data handled in digital broadcast is compressed in MPEG2 format, when the STB 103 transfers video data to another device connected to the 1394 interface, if the device lacks an MPEG decoding function, the STB 103 side decompresses the MPEG2 data and transmits the data. Further, the STB 103 can generate MPEG compressed video data by utilizing the MPEG encoder.

In addition to these functions, the STB 103 is expected to serve as a home gate way at home. Other purposes of realizing browser and mail functions by connecting the STB to the Internet, performing time shift recording in place of a video tape recorder, and the like, are possible by addition of optional cable MODEM and HDD digital recording function and the like.

As described above, as the STB generally functions as a digital tuner, it usually lacks a print emulate function. Accordingly, it is impossible in the STB 103 to realize data conversion processing as executed in a direct print system.

However, as it is understood from FIG. 28, since the STB 103 has a construction similar to that of a general personal computer, only if a program is executed in a common environment, the data conversion processing can be performed in the STB 103 by downloading an execution program from another device (the digital camera 101 or the printer 102). That is, assuming that the STB 103 has the same the operating system (OS) as that of the other devices, as the execution programs of the other devices are compatible at binary level with each other, the data conversion processing can be performed in the STB 103 only if the STB has a memory area for downloading a necessary program.

Note that even when the STB 103 has no sufficient internal memory area, if the STB has an optional HDD, the execution program can be downloaded to the HD. In this case, as program transfer is required besides data transfer, transfer time for the program transfer must be taken into consideration.

<Data Conversion Processing in Present Embodiment>

Hereinbelow, data conversion processing upon direct printing in the present embodiment will be described.

Figure 29:
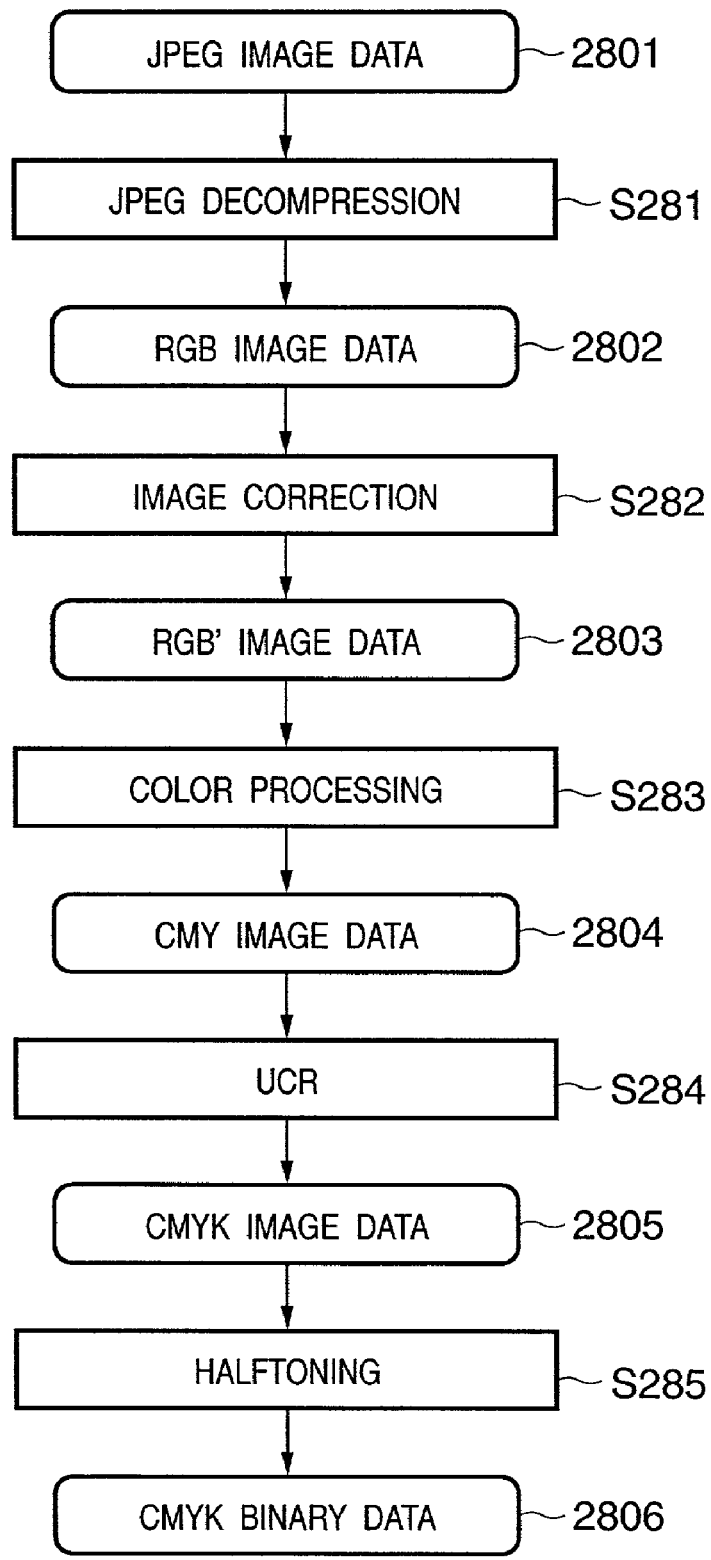
FIG. 29 is a flowchart showing processing to convert image data, obtained by the digital camera and compressed to JPEG format data, to print data corresponding to the printer.

FIG. 29 is a flowchart showing processing to convert image data, obtained by the digital camera 101 and compressed to JPEG format data, to print data corresponding to the printer 102, and data formats prior to/subsequent to respective steps.

First, to perform image processing, as it is necessary to decompress compressed data, JPEG data 2801 is converted by JPEG decompression processing (S281) to RGB data 2802.

Then the RGB data 2802 is subjected to image correction processing (S282) to correct image contrast, brightness, gamma, colorfulness, color fogging, outline and the like, and converted to corrected RGB'data 2803.

The RGB' data 2803 is converted by color processing (S283) to CMY data 2804 representing cyan, magenta and yellow colors in correspondence with color space determined by inks used in the printer 102.

The CMY data 2804 is subjected to UCR (Under Color Removal) processing (S284) to extract black component and add black data to the data, thus converted to CMYK data 2805 representing 4 CMYK colors.

Further, the multivalue CMYK data 2805 must be binarized or quantized in correspondence with the ink-jet printing method as a printing method of the printer 102. Accordingly, the multivalue CMYK data 2805 is converted by halftoning processing (S285) to CMYK data corresponding to the resolution of the printer 102. That is, the multivalue CMYK data is converted by utilizing pseudo halftone processing such as the error diffusion method or the dither method, to binary, ternary or quaternary CMYK data corresponding to the resolution of the printer 102. Note that in FIG. 29, the CMYK data 2805 is converted to CMYK binary data 2806.

The CMYK binary data 2806 is finally converted by the printer 102 to discharge pattern data corresponding to the structure of the printhead 2307, and the printhead 2307 is driven based on the data.

Figure 30:
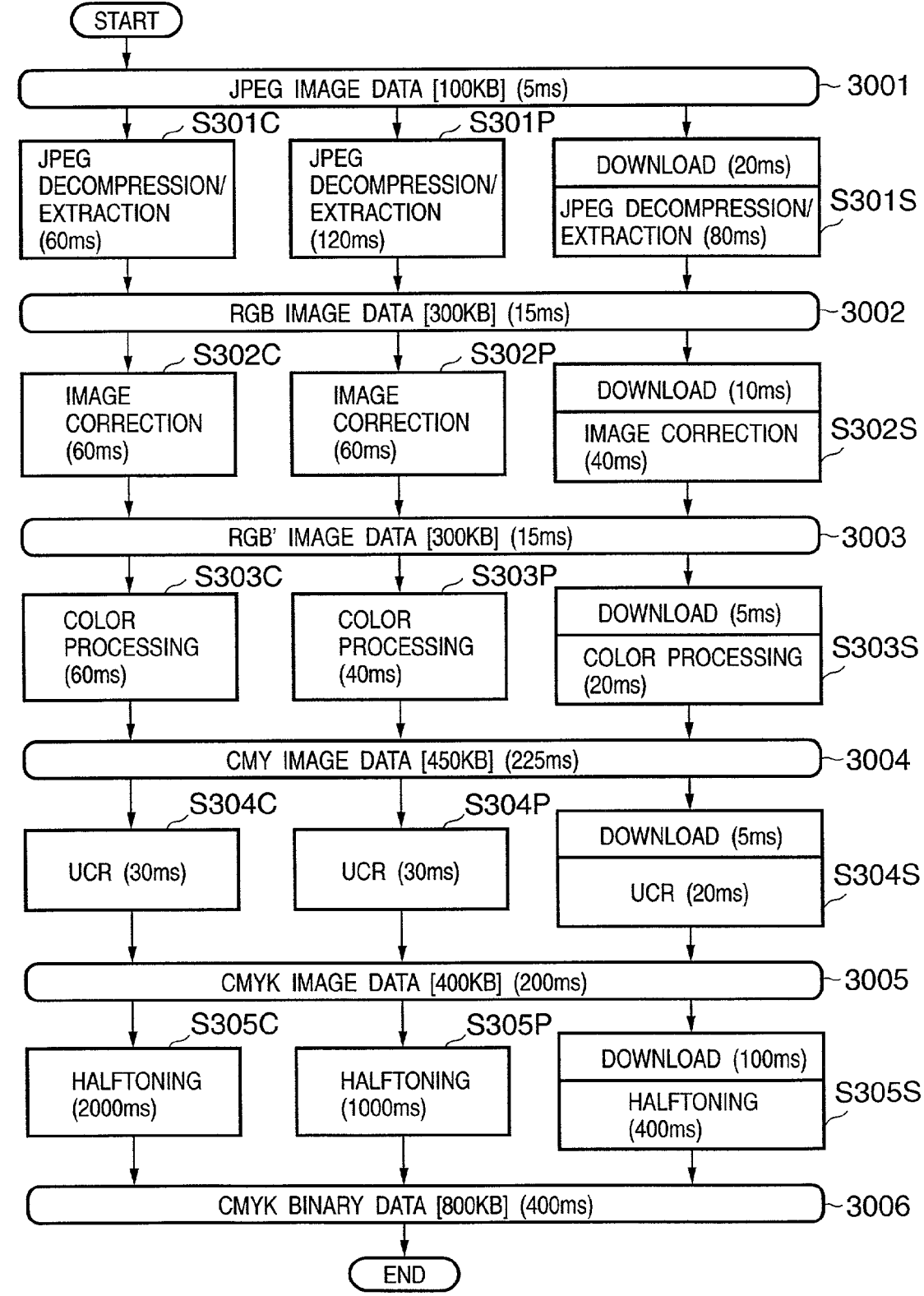
FIG. 30 is a view showing an example of processing times in respective devices.

FIG. 30 is a view showing an example of processing times if the respective processings are performed in the digital camera 101, the printer 102 and the STB 103. In this case, sample 100K byte JPEG data is processed by the digital camera 101, the printer 102 and the STB 103, and processing times are measured. Note that the sample image is not particularly limited, but it can be considered that a measurement error hardly occurs in use of JPEG image data having non-simple color gradations.

FIG. 30 shows image data in the respective formats (3001 to 3006) with data amounts (bracketed by [ ]) and data transfer time between devices (bracketed by ( )) Note that as the data transfer speed of 1394 serial bus, about 400 MB/s is attained in S400 standard, however, as overhead necessary for protocol negotiation is added to the speed, the actual transfer speed is about the half of the above speed, 200 MB/s.

Further, FIG. 30 shows sample image data processing times in brackets ( ) in the respective processings (S301C, P, S to S305 C, P, S: C, P and S correspond to the digital camera 101, the printer 102 and the STB 103). If these processing times are used as performance values, the processing performance is higher as the value is smaller, and the value can be used as an index of actual unit processing time.

In FIG. 30, the use of the STB 103 having high CPU performance can reduce processing time in comparison with the other devices, i.e., increases the performance. However, if the STB 103 is used, an execution program must be downloaded from the other device (the digital camera 101 or the printer 102), the total throughput cannot be simply improved only by execution of all the processings by the STB 103. FIG. 30 shows as an example of download times for downloading the execution programs from the printer 102.

Here time actually required for converting the sample image data is calculated by using data processing time as shown in FIG. 30 for each processing pattern each device.

① Digital Camera 101

The total processing time is calculated in the case where the digital camera 101 performs all the image processings and finally transmits the generated print data to the printer 102. In this case, the processings are executed in the processing route in FIG. 30

S301C→S302C→S303C→S304C→S305C→3006, the total execution time is

60+60+60+30+2000+400=2610(ms).

②Printer 102

In the case where the printer 102 receives the image data from the digital camera 101 and performs the porocessings to generate the print data, the processings are executed in the processing route in FIG. 30

3001→S301P→S302P→S303P→S304P→S305P, the total execution time is

5+120+60+40+30+1000=1255(ms).

This is about the half of the time of the processing only by the digital camera 101.

③ STB 103

In the case where the STB 103 performs the image processings, the processings are executed in the processing route in FIG. 30

3001→S301S→S302S→S303S→S304S→S3006, the total execution time is

5+(20+80)+(10+40)+(5+20)+(5+20)+(100+400)+
400=1105(ms).

As the optimum processing route in consideration of each data processing time and data transfer time based on the result of calculations ① to ③, the following route is determined. That is, as the data transfer time is shorter if data transfer is performed prior to CMY data conversion, the JPEG decompression and the image correction are executed by the digital camera 101 side (S301C→S302C), and the RGB'image data 3003 is transferred to the STB 103. Then, the conversion processings to obtain the CMYK binary data 3006 (S303S→S304S→S305S) are executed by the STB 103, and the generated print data 3006 is transmitted to the printer 102. Thus the direct printing is performed.

The total processing time in this case is the shortest as follows.

60+60+15+(5+20)+(5+20)+(100+400)+400=1085(ms)

FIG. 31 is a flowchart showing executing device selection processing by actual negotiation among the respective devices on the 1394 interface.

Note that the executing device selection processing in FIG. 31 can be performed in any of the devices as long as it exists on the 1394 network. For example, the processing is performed by a bus manager.

Note that an image processing execution program has been downloaded from the printer 102 to the STB 103 prior to the execution of the processing.

First, each of the devices interconnected by the 1394 interface reads CSR (S3101) to obtain information of each device so as to check each device type.

Next, among the image supply device (digital camera 101), the printing device (printer 102) and the other device (STB 103) having an OS common to these devices, sample data is transmitted (S3102) to generate an index of data processing speed, and processing times of the respective devices are measured (S3103).

Then, an optimum processing device and processing route are selected (S3104) based on the measured processing times, and transmission of image data as an actual processing object to the device is started (S3105). Then, print processing based on the image data i.e. direct printing is completed (S3106) in the optimum processing route.

As described above, according to the present embodiment, when direct printing based on image data is performed in the system where the digital camera 101 and the printer 102 are interconnected by the 1394 serial bus, if the STB 103 connected to the common interface can perform data processing by downloading an execution program to the STB, processing performance information of the respective devices are calculated with regard to the respective image processings of the series of data conversion processings from image data to print data, thereby optimum process executing device and optimum processing route are determined. Thus efficient data processing can be performed.

[Other Embodiments]

Note that in the above-described embodiment, the description has been made on the devices connected to the serial bus known as 1394-standard compliant serial bus, however, the present invention is also applicable to devices other than the devices connected to the 1394-standard compliant serial bus.

Further, the present invention is not limited to the network constructed by the serial interface complying with the IEEE 1394, however, the present invention is also applicable to a network constructed by using an arbitrary serial interface such as a Universal Serial Bus (USB) interface.

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, program codes corresponding to the above-described flow charts are stored in this storage medium.

As many apparently widely different embodiments of the present invention can be made without departing from the spirit and scope thereof, it is to be understood that the invention is not limited to the specific embodiments thereof except as defined in the appended claims.

What is claimed is:

1. An image processing system having plural devices, including a device capable of executing predetermined image processing, interconnected via a serial bus,
wherein a processing program for execution of said image processing is downloaded from said device capable of executing predetermined image processing to a device, which does not have a function of executing said image processing, among said plural devices,
wherein processing performance information indicating performance of executing said image processing upon using the downloaded processing program is obtained from each of said plural devices, and
wherein an executing device to execute said image processing is determined from said plural devices based on said processing performance information, time to be taken for downloading the processing program, and time to be taken for transforming image data.

2. The image processing system according to claim 1, wherein said processing performance information is obtained at each of plural processing steps constructing said image processing.

3. The image processing system according to claim 2, wherein said processing performance information is obtained by measuring processing time upon execution of said image processing on predetermined sample image data.

4. The image processing system according to claim 2, wherein said executing device is determined at each of plural processing steps constructing said image processing based on said processing performance information.

5. The image processing system according to claim 1, wherein said plural devices include an image supply device and an image printing device.

6. The image processing system according to claim 5, wherein said plural devices include a digital broadcast tuner, and wherein the processing program for execution of said image processing is downloaded to said tuner.

7. The image processing system according to claim 6, wherein said tuner is a set top box.

8. The image processing system according to claim 1, wherein said image processing is processing of transforming image data to print data.

9. A control method of an image processing system having plural devices, including a device capable of executing predetermined image processing, interconnected via a serial bus,
wherein a processing program for execution of said image processing is downloaded from said device capable of executing predetermined image processing to a device, which does not have a function of executing said image processing, among said plural devices,
wherein processing performance information indicating performance of executing said image processing upon using the downloaded processing program is obtained from each of said plural devices, and
wherein an executing device to execute said image processing is determined from said plural devices based on said processing performance information, time to be taken for downloading the processing program, and time to be taken for transforming image data.

10. The control method of the image processing system according to claim 9, wherein said processing performance information is obtained at each of plural processing steps constructing said image processing.

11. The control method of the image processing system according to claim 10, wherein said processing performance information is obtained by measuring processing time upon execution of said image processing on predetermined sample image data.

12. The control method of the image processing system according to claim 10, wherein said executing device is determined at each of plural processing steps constructing said image processing based on said processing performance information.

13. An image processing apparatus, connected to plural devices via a serial bus, capable of executing of predetermined image processing,
wherein a processing program for execution of said image processing is downloaded to a device which does not have a function of executing said image processing, among said plural devices,
wherein processing performance information indicating performance of executing said image processing upon using the downloaded processing program is obtained from each of said plural devices and said apparatus, and
wherein an executing device to execute said image processing is determined from said plural devices and said apparatus based on said processing performance information, time to be taken for downloading the processing program, and time to be taken for transforming image data.

14. The image processing apparatus according to claim 13, wherein said processing performance information is obtained at each of plural processing steps constructing said image processing.

15. The image processing apparatus according to claim 14, wherein said processing performance information is obtained by measuring processing time upon execution of said image processing on predetermined sample image data.

16. The image processing apparatus according to claim 13, wherein said executing device is determined at each of plural processing steps constructing said image processing based on said processing performance information.

17. An image processing apparatus connected to plural devices including a device capable of executing predetermined image processing interconnected via a serial bus, said apparatus not having a function of executing said image processing,
wherein a processing program for execution of said image processing is downloaded from said device capable of executing said image processing,
wherein processing performance information indicating performance of executing said image processing upon using the downloaded processing program is obtained from each of said plural devices and said apparatus, and
wherein an executing device to execute said image processing is determined from said plural devices and said apparatus based on said processing performance information, time to be taken for downloading the processing program, and time to be taken for transforming image data.

18. The image processing apparatus according to claim 17, wherein said processing performance information is obtained at each of plural processing steps constructing said image processing.

19. The image processing apparatus according to claim 17, wherein said processing performance information is obtained by measuring processing time upon execution of said image processing on predetermined sample image data.

20. The image processing apparatus according to claim 17, wherein said executing device is determined at each of plural processing steps constructing said image processing based on said processing performance information.

21. A computer-readable storage medium holding a control program for controlling an image processing system having plural devices, including a device capable of executing predetermined image processing, interconnected via a serial bus, wherein said program comprises:

code for downloading a processing program for execution of said image processing from said device capable of executing predetermined image processing to a device, which does not have a function of executing said image processing, among said plural devices, code for obtaining processing performance information indicating performance of executing said image processing upon using the downloaded processing program from each of said plural devices, and code for determining an executing device to execute said image processing from said plural devices based on said processing performance information, time to be taken for downloading the processing program, and time to be taken for transforming image data.

* * * * *

UNITED STATES PATENT AND TRADEMARK OFFICE
CERTIFICATE OF CORRECTION

PATENT NO. : 7,184,156 B2  Page 1 of 1
APPLICATION NO. : 09/934855
DATED : February 27, 2007
INVENTOR(S) : Tateyama It is certified that error appears in the above-identified patent and that said Letters Patent is hereby corrected as shown below:

In the Drawings

SHEET 25:
FIG. 24, "keywordleaf" should read -- keyword leaf --.

COLUMN 1:
Line 56, "CPU's" should read -- CPUs --.

COLUMN 6:
Line12, " ①) " should read -- ① --.

COLUMN 17:
Line 35, "same the" should read -- same --.

COLUMN 18:
Line 59, "pattern" should read -- pattern from --.

COLUMN 21:
Line 41, "is processing" should read -- is a process --.

Signed and Sealed this

Twenty-fifth Day of March, 2008

JON W. DUDAS
*Director of the United States Patent and Trademark Office*